(12) United States Patent
Nagasaka

(10) Patent No.: US 8,929,685 B2
(45) Date of Patent: Jan. 6, 2015

(54) DEVICE HAVING IMAGE RECONSTRUCTING FUNCTION, METHOD, AND RECORDING MEDIUM

(71) Applicant: Casio Computer Co., Ltd., Tokyo (JP)

(72) Inventor: Tomoaki Nagasaka, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 229 days.

(21) Appl. No.: 13/714,864

(22) Filed: Dec. 14, 2012

(65) Prior Publication Data

US 2013/0169837 A1 Jul. 4, 2013

(30) Foreign Application Priority Data

Dec. 28, 2011 (JP) ................................. 2011-290175

(51) Int. Cl.
| | |
|---|---|
| *G06K 9/32* | (2006.01) |
| *G06K 9/36* | (2006.01) |
| *H04N 5/228* | (2006.01) |
| *H04N 5/225* | (2006.01) |
| *G06T 11/00* | (2006.01) |
| *H04N 5/232* | (2006.01) |

(52) U.S. Cl.
CPC .............. *G06T 11/003* (2013.01); *H04N 5/232* (2013.01)
USPC ......... 382/293; 348/222.1; 348/340; 382/276

(58) Field of Classification Search
USPC ....................... 348/222.1, 231.99–231.9, 239, 348/294–324, 333.01–333.12, 335–343; 382/276–301
See application file for complete search history.

(56) References Cited

U.S. PATENT DOCUMENTS

| | | | |
|---|---|---|---|
| 8,558,915 B2* | 10/2013 | Morimoto | 348/230.1 |
| 2007/0230944 A1* | 10/2007 | Georgiev | 396/322 |
| 2007/0252074 A1* | 11/2007 | Ng et al. | 250/208.1 |
| 2009/0128658 A1* | 5/2009 | Hayasaka et al. | 348/222.1 |
| 2009/0185801 A1* | 7/2009 | Georgiev et al. | 396/332 |

(Continued)

FOREIGN PATENT DOCUMENTS

| | | | |
|---|---|---|---|
| JP | 2008-515110 A | 5/2008 | |
| JP | 2009-229125 A | 10/2009 | |
| JP | 2012-216992 A | 11/2012 | |

OTHER PUBLICATIONS

Japanese Office Action dated Apr. 16, 2013 (and English translation thereof) in counterpart Japanese Application No. 2011-290175.

*Primary Examiner* — Michael Osinski
(74) *Attorney, Agent, or Firm* — Holtz, Holtz, Goodman & Chick PC

(57) ABSTRACT

A mask acquisition unit acquires a mask (region information) that matches photography setting information acquired by a photography setting acquisition unit, the mask defining a sub-image region of a light field image acquired by an LFI acquisition unit. A prototype definition unit disposes a prototype of a reconstructed image at a position of reconstruction setting in a reconstruction setting storage unit. A reconstructed pixel selecting unit selects a pixel of interest from pixels of a reconstructed image. A corresponding pixel extracting unit extracts, as a corresponding pixel, a pixel that corresponds to the pixel of interest and is included in a sub-image region of the acquired mask. A pixel value calculation unit calculates a pixel value of the pixel of interest from a pixel value of the corresponding pixel. An output unit decides pixel values of all reconstructed pixels as pixels of interest and generates and outputs a reconstructed image.

12 Claims, 13 Drawing Sheets

(56) References Cited

U.S. PATENT DOCUMENTS

| | | |
|---|---|---|
| 2010/0045844 A1* | 2/2010 | Yamamoto et al. ............ 348/340 |
| 2010/0215354 A1* | 8/2010 | Ohnishi ......................... 396/113 |
| 2010/0283884 A1* | 11/2010 | Hayasaka et al. ............. 348/340 |
| 2012/0019711 A1 | 1/2012 | Ng et al. |
| 2012/0019712 A1 | 1/2012 | Ng et al. |
| 2012/0147247 A1* | 6/2012 | Anada et al. ................... 348/335 |
| 2012/0154651 A1* | 6/2012 | Ohno ............................. 348/294 |
| 2012/0229691 A1* | 9/2012 | Hiasa et al. .................... 348/340 |
| 2012/0249823 A1* | 10/2012 | Nakagome et al. ......... 348/222.1 |
| 2012/0327259 A1* | 12/2012 | Tamura ....................... 348/222.1 |
| 2013/0064453 A1* | 3/2013 | Nagasaka et al. ............. 382/190 |
| 2013/0128087 A1* | 5/2013 | Georgiev et al. .............. 348/307 |
| 2013/0162779 A1* | 6/2013 | Yamamoto ...................... 348/46 |
| 2013/0162861 A1* | 6/2013 | Yamamoto ................. 348/222.1 |
| 2013/0162866 A1* | 6/2013 | Kimura .................... 348/231.99 |
| 2013/0258057 A1* | 10/2013 | Mishima et al. ................ 348/46 |

* cited by examiner

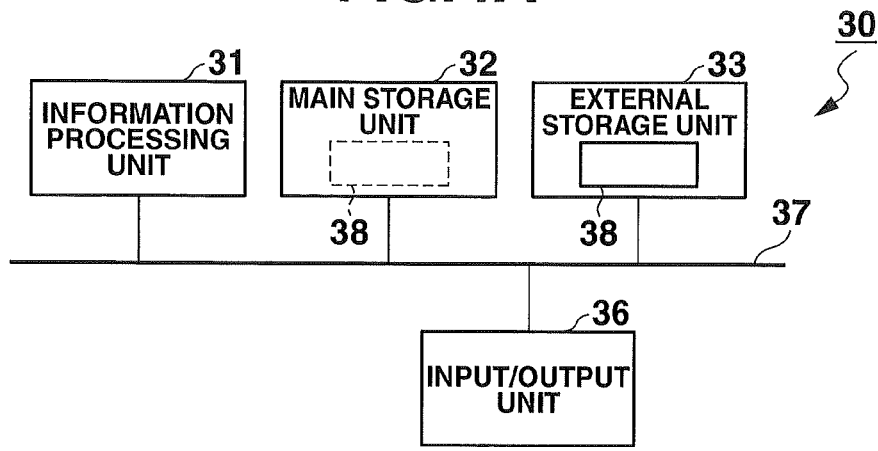
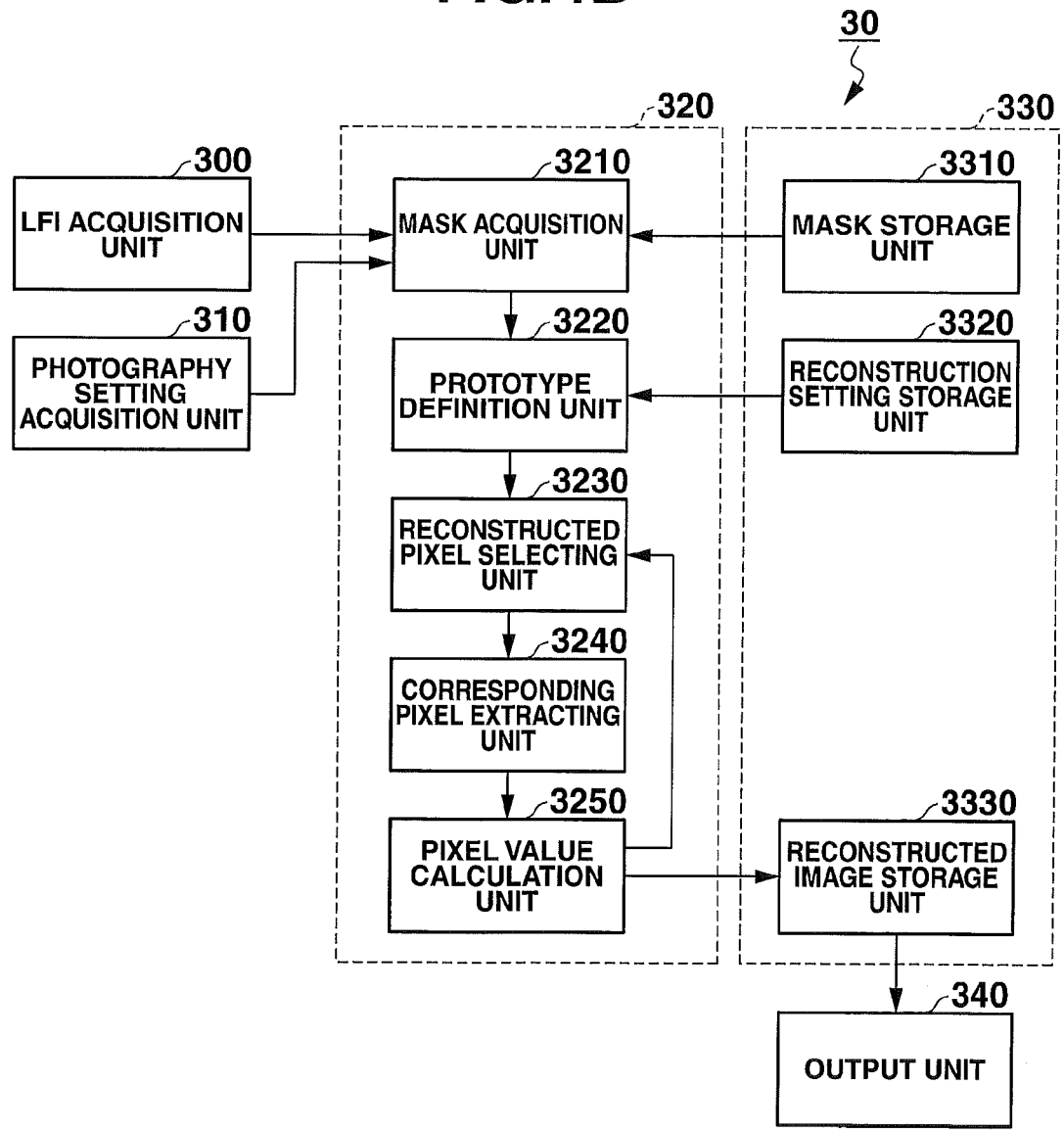

FIG.7

| PARAMETER-MASK CORRESPONDENCE TABLE | | |
|---|---|---|
| ZOOM VALUE | APERTURE VALUE | MASK |
| 1 | 1-10 | #1 |
| 1 | 10-20 | #2 |
| 1 | 20-30 | #3 |
| ... | ... | ... |
| 1 | 80-100 | #m |
| 2 | 1-13 | #m+1 |
| 2 | 14-24 | #m+2 |
| ... | ... | ... |
| N | 90-100 | #M |

DEVICE HAVING IMAGE RECONSTRUCTING FUNCTION, METHOD, AND RECORDING MEDIUM

CROSS-REFERENCE TO RELATED APPLICATION

This application claims the benefit of Japanese Patent Application No. 2011-290175 filed Dec. 28, 2011, the entire disclosure of which is incorporated by reference herein.

FIELD

This application relates to an image-reconstructing technique.

BACKGROUND

An art is known that acquires images of an object photographed from different viewpoints to obtain the directions and amounts of all light rays reflecting from the object and entering a lens of a camera.

Relating to such an art, an art is known that acquires images obtained by photographing an object, and reconstructs, from the images, an image of the object with different focal length, depth of field and/or the like. In this art, a pixel in a light field image corresponding to a pixel in a reconstructed image (a reconstructed pixel) is decided by ray trace, and generates a reconstructed image on the basis of a pixel value of the corresponding pixel.

SUMMARY

An image generation device according to a first aspect of the present invention generates a reconstructed image from a light field image including sub-images taken from different viewpoints, and comprises a parameter acquiring section which acquires a photographing parameter in taking the light field image; an information acquiring section which acquires region information that decides a region of the sub-images included in the light field image based on the photographing parameter; a defining section which defines correspondence between a reconstructed pixel composing the reconstructed image and a sub-pixel in the region of the sub-images that was decided by the region information; and a generating section which decides a pixel value of the reconstructed pixel based on a pixel value of the corresponding sub-pixel to generate the reconstructed image.

A digital camera according to a second aspect of the present invention comprises: a photographing section which uses a main lens and micro-lenses to take a light field image including sub-images taken from different viewpoints; a parameter acquiring section which acquires a photographing parameter in taking the light field image; an information acquiring section which acquires region information that decides a region of the sub-images included in the light field image based on the photographing parameter; a defining section which defines correspondence between a reconstructed pixel composing a reconstructed image generated from the light field image and a sub-pixel in the region of the sub-images that was decided by the region information; and a generating section which decides a pixel value of the reconstructed pixel based on a pixel value of the corresponding sub-pixel to generate the reconstructed image.

A method of generating a reconstructed image according to a third aspect of the present invention is a method generating a reconstructed image from a light field image including sub-images taken from different viewpoints, and comprises the steps of: acquiring a photographing parameter in taking the light field image; acquiring region information that decides a region of the sub-images included in the light field image based on the photographing parameter; defining correspondence between a reconstructed pixel composing the reconstructed image and a sub-pixel in the region of the sub-images that was decided by the region information; and deciding a pixel value of the reconstructed pixel based on a pixel value of the corresponding sub-pixel to generate the reconstructed image.

A non-transitory computer readable recording medium according to a fourth aspect of the present invention is a recording medium having stored thereof a program executable by a computer that controls an image generation device to generate a reconstructed image from a light field image including sub-images taken from different viewpoints, the program causing the computer to realize functions of: acquiring a photographing parameter in taking the light field image; acquiring region information that decides a region of the sub-images included in the light field image based on the photographing parameter; defining correspondence between a reconstructed pixel composing the reconstructed image and a sub-pixel in the region of the sub-images that was decided by the region information; and deciding a pixel value of the reconstructed pixel based on a pixel value of the corresponding sub-pixel to generate the reconstructed image.

BRIEF DESCRIPTION OF THE DRAWINGS

A more complete understanding of this application can be obtained when the following detailed description is considered in conjunction with the following drawings, in which:

FIG. 4A is a diagram illustrating a physical configuration of an image reconstruction device according to the first embodiment;

FIG. 4B is a diagram illustrating a functional configuration of the image reconstruction device according to the first embodiment;

FIG. 7 is an example of a parameter-mask correspondence table according to the first embodiment;

DETAILED DESCRIPTION

Hereinafter, a digital camera and an image reconstruction device (image generation device) according to an embodiment to embody the present invention will be described with reference to drawings. Identical or corresponding portions have the same numbers in drawings.

First Embodiment

Figure 1:
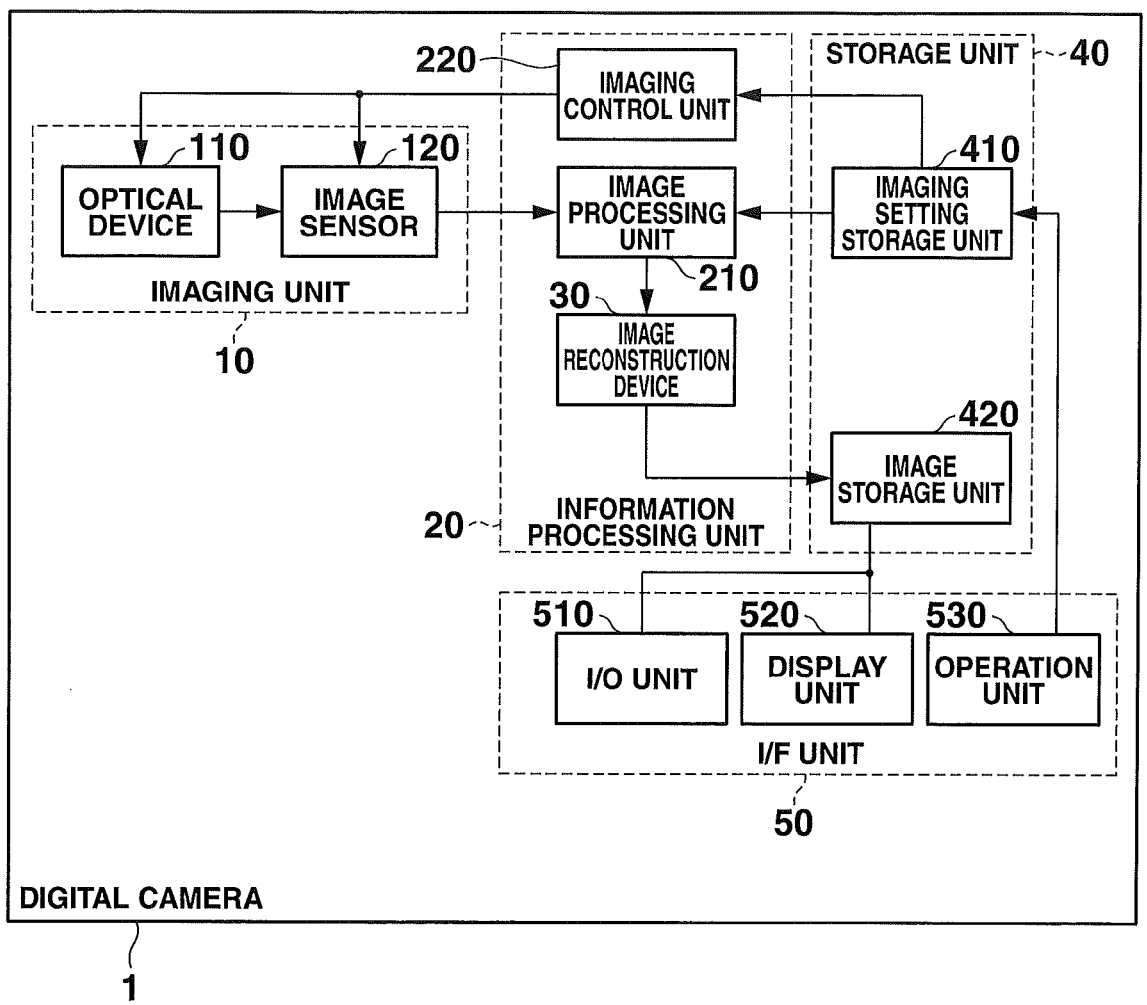
FIG. 1 is a diagram illustrating a configuration of a digital camera according to a first embodiment of the present invention.

An image reconstruction device 30 according to a first embodiment is mounted in a digital camera 1 illustrated in FIG. 1. The digital camera 1 has functions of photographing an object to acquire a light field image composed of sub-images, and generating a reconstructed image. Of these functions, the image reconstruction device 30 is in charge of generating a reconstructed image from a light field image including sub-images.

The digital camera 1 includes an imaging unit 10, an information processing unit 20 including the image reconstruction device 30, a storage unit 40, and an interface unit (I/F unit) 50, as illustrated in FIG. 1. The digital camera 1 uses such a configuration to acquire information of light ray coming from outside the camera (from an object), reconstruct an image representing the object, and display the image.

The imaging unit 10 is composed of an optical device 110 and an image sensor 120, and takes an image of an object from viewpoints.

Figure 2:
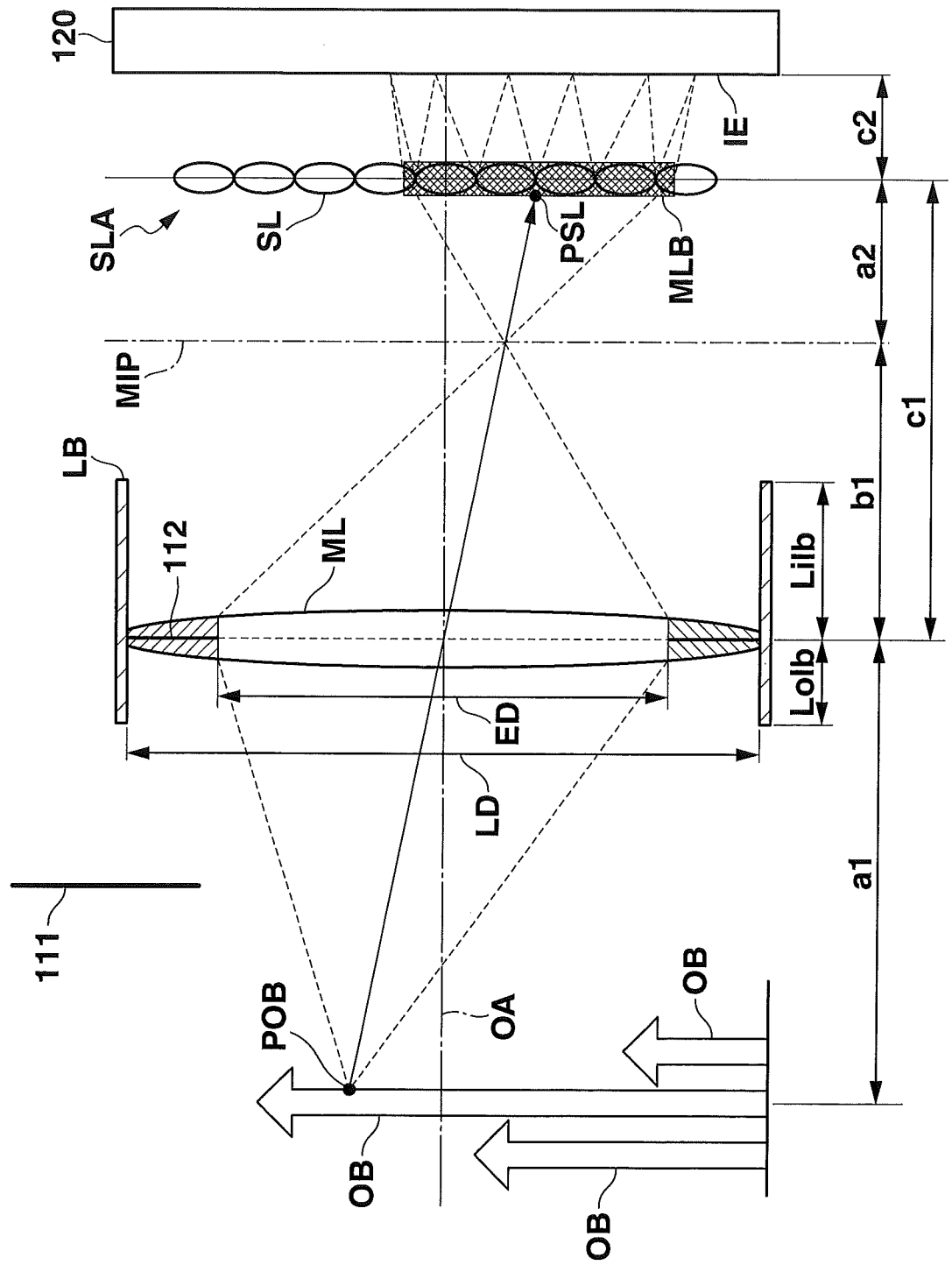
FIG. 2 is a diagram illustrating a configuration of an optical system of the digital camera according to the first embodiment.

The optical device 110 is composed of a shutter 111, an aperture 112, a main lens ML and a sub-lens array SLA (micro lens array), as illustrated in FIG. 2. The optical device 110 uses the main lens ML to catch light rays from outside and projects, an optical image obtained from a viewpoint of an optical center of each of the sub-lenses SL composing the sub-lens array SLA, on the image sensor 120 (an imaging area IE).

The image sensor 120 converts the optical image projected by the optical device 110 to an electrical signal and transmits the electrical signal to the information processing unit 20. The image sensor 120 is composed of an imaging element such as a charge coupled device (CCD) and a complementary metal oxide semiconductor (CMOS), and a transmission unit that transmits an electrical signal generated by the imaging element to the information processing unit 20.

The shutter 111 controls incidence and shielding of external light to the image sensor 120. The aperture 112 shields part of light entering into the main lens to limit a transmissive portion of the main lens so as to correspond to an aperture value indicated by imaging setting.

The main lens ML is composed of one or more convex lenses, concave lenses, aspheric lenses, or the like. The main lens ML forms an image from light of a photographed object OB at the time of photographing, as an optical image, on a virtual imaging plane MIP between the main lens ML and the sub-lens array SLA. At the time of photographing, a photographed object OB is not limited to one, but objects, each being apart from the main lens ML by a different distance, may be photographed, as illustrated in FIG. 2.

The sub-lens array SLA is composed of M x N sub-lenses (micro-lenses) SL arranged in a lattice pattern on a plane surface. The sub-lens array SLA observes an optical image formed by the main lens ML on the imaging plane MIP as a viewpoint of the optical center of each of the sub-lenses SL to form an optical image on the imaging area IE composing the image sensor 120. Space between a plane made by the main lens ML and a plane made by the imaging area IE is called a light field.

With respect to the main lens ML, a largest diameter LD and an effective diameter ED can be defined. The largest diameter LD is a physical diameter of the main lens ML. Meanwhile, the effective diameter ED is a diameter of a region that can be used for photographing, of the main lens ML. Outside the effective diameter ED of the main lens ML is a region where light rays that pass through a peripheral portion of the main lens ML are not effective (a region with a lot of noise) or a region through which light rays do not pass since various filters and the aperture 112 attached to the main lens ML, and a physical structure in the vicinity of the main lens ML block light rays incident to and leaving the main lens.

The effective diameter ED can be defined by measuring a portion where light rays are blocked by a physical structure such as the filters and acquiring an F-ratio of the aperture 112 indicated by imaging setting.

In an example in FIG. 2, light rays from a portion POB of an object OB pass through a portion composing the effective diameter ED of the main lens ML (an effective portion) and are projected onto the sub-lenses SL. In this way, light reflected from the portion POB of the object OB passes the effective portion of the main lens ML and is projected onto a region of the sub-lenses SLA. The region is called a main lens blur MLB (a shaded portion in FIG. 2) of the portion POB.

The main lens ML is accommodated in a lens barrel LB. The lens barrel LB is divided by an optical center of the main lens ML to an object-to-be photographed side (an outer lens barrel) and an imaging plane MIP side (an inner lens barrel). In FIG. 2, a length of the outer lens barrel is Lolb, and a length of the inner lens barrel is Lilb. A distance between the optical center of the main lens ML and the imaging plane MIP of the main lens is b1; a distance between the imaging plane MIP and a plane made by the sub-lens array SLA is a2; a distance between the sub-lens array SLA and the imaging area IE of the image sensor is c2; and a distance between the main lens ML and the sub-lens array SLA is c1.

The imaging unit 10 uses the above configuration to take a light field image (LFI) that includes information of all light rays that pass through the light field.

Figure 3A:
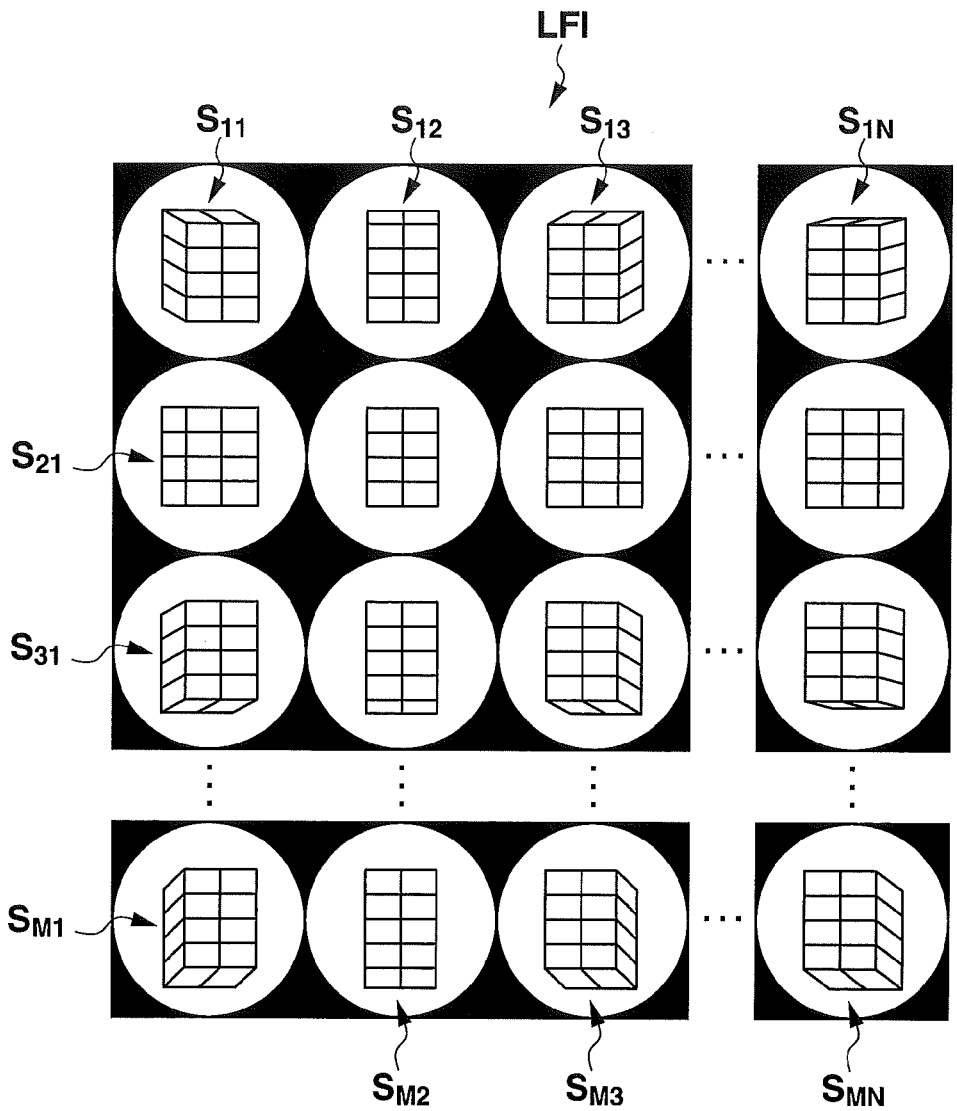
FIG. 3A is a conceptual diagram illustrating a light field image according to the first embodiment.

FIG. 3A illustrates one example of an LFI obtained by photographing a block-shaped object OB.

This LFI is composed of images (sub-images S, $S_{11}$ to $S_{MN}$), each corresponding to each of the M×N pieces of sub-lenses SL (micro-lenses) arranged in a lattice pattern. For example, a sub-image $S_{11}$ at the upper left corresponds to an image obtained by photographing the object OB from the upper left, and a sub-image $S_{MN}$ at the lower right corresponds to an image obtained by photographing the object OB from the lower right.

Sub-images in the i-th row (sub-images in one horizontal row) $S_{i1}$ to $S_{iN}$ correspond to stereo images obtained in such a way that sub-lenses SL arranged horizontally in the i-th row of the sub-lens array SLA forms an image formed by the main lens ML into the stereo images. Similarly, sub-images in the j-th column (sub-images in one vertical column) $S_{1j}$ to $S_{Mj}$ correspond to stereo images obtained in such a way that sub-lenses SL arranged vertically in the j-th column of the sub-lens array (micro-lens array) SLA forms an image formed by the main lens ML into the stereo images.

Figure 3B:
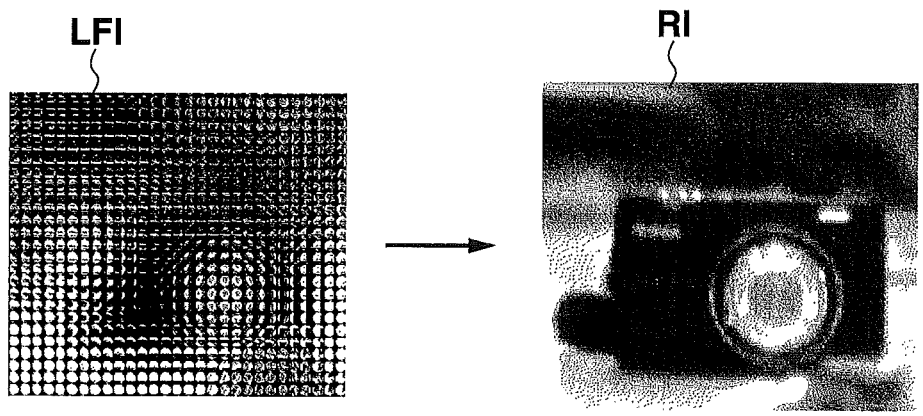
FIG. 3B is a diagram illustrating an example of a light field image and a reconstructed image according to the first embodiment.

The digital camera 1 generates a reconstructed image (RI) that is an image of reconstruction of an object from an LFI, as illustrated in FIG. 3B.

Each of the sub-images S in the present embodiment is a grayscale image, and each of pixels composing the sub-images has a pixel value (scalar value).

The information processing unit 20 illustrated in FIG. 1 is physically composed of a central processing unit (CPU), a random access memory (RAM), an internal bus and an I/O port, and functions as an image processing unit 210, the image reconstruction device 30 and an imaging control unit 220.

The image processing unit 210 acquires an electrical signal from the image sensor 120, and converts the acquired electrical signal to image data on the basis of imaging setting information stored in an imaging setting storage unit 410 of the storage unit 40. The image processing unit 210 transmits the image data as well as photography setting information that is imaging setting information to which predetermined information (fixed parameters) is added, to the image reconstruction device 30.

The image reconstruction device 30 uses an LFI transmitted from the image processing unit 210 to generate a reconstructed image. Processing of generating a reconstructed image by the image reconstruction device 30 will be described later.

The image reconstruction device 30 stores the generated reconstructed image in an image storage unit 420 of the storage unit 40.

The imaging control unit 220 controls the imaging unit 10 on the basis of imaging setting information stored in the imaging setting storage unit 410 of the storage unit 40, and uses the imaging unit 10 to photograph an object OB.

The storage unit 40 is composed of a main storage unit such as a random-access memory (RAM), and an external storage unit composed of a nonvolatile memory such as a flash memory and a hard disk.

Into the main storage unit are loaded a control program and information stored in the external storage unit, and the main storage unit is used as a work area of the information processing unit 20.

The external storage unit has previously stored a control program to have the information processing unit 20 perform processing that will be described later and information, and transmits these control program and information to the main storage unit according to an instruction from the information processing unit 20. The external storage unit also stores information based on processing of the information processing unit 20 and information transmitted from the interface unit 50, according to an instruction from the information processing unit 20.

The storage unit 40 is functionally composed of the imaging setting storage unit 410 and the image storage unit 420.

The imaging setting storage unit 410 stores imaging setting information. The imaging setting information (imaging parameters) includes, as imaging parameters that can be changed in photographing, a distance between the main lens ML and the sub-lens array SLA, a focal length $f_{ML}$ of the main lens, a length of an inner side of the lens barrel LB (an inner lens barrel length) that accommodates the main lens and a length of an outer side thereof (an outer lens barrel length), information specifying exposure time, an aperture (F-ratio, corresponding to an effective diameter ED of the main lens), and a shutter speed. In the present embodiment, a zoom value is used as a parameter that uniquely corresponds to each of a focal length $f_{ML}$ of the main lens, an inner lens barrel length and an outer lens barrel length, and a distance between the main lens ML and the sub-lens array SLA. The imaging setting information (imaging parameters) further includes, as fixed parameters (existing values), a largest diameter LD of the main lens, and information of a position of each of the sub-lenses SL composing the sub-lens array SLA relative to an optical axis OA of the main lens. The imaging setting storage unit 410 also stores information such as a distance c1 between the main lens ML and the sub-lens array SLA, a distance c2 between the sub-lens array SLA and a surface of the imaging element (imaging area IE), a diameter of each of the sub-lenses, and a position of the imaging element relative to each of the sub-lenses.

The imaging setting storage unit 410 transmits imaging parameters to the imaging control unit 220. The imaging setting storage unit 410 also transmits imaging setting information of the imaging unit 10 and information indicating fixed parameters to the image processing unit 210.

The image storage unit 420 stores an image reconstructed by the image reconstruction device 30. The image storage unit 420 transmits the stored image to an I/O unit 510 and a display unit 520 of the interface unit 50.

The interface unit (described as I/F UNIT in drawings) 50 has a configuration of an interface between the digital camera 1 and a user thereof or an external device, and is composed of the I/O unit 510, display unit 520 and an operation unit 530.

The input/output unit (I/O unit) 510 is physically composed of a universal serial bus (USB) connector, a video output terminal, and an input/output control unit. The I/O unit 510 outputs information stored in the storage unit 40 to an external computer, and transmits information transmitted from outside to the storage unit 40.

The display unit 520 is composed of a liquid crystal display unit, an organic electro luminescence (EL) display or the like, and displays a screen for inputting an imaging parameter stored in the imaging setting storage unit 410 and a screen for operating the digital camera 1. The display unit 520 also displays an image stored in the image storage unit 420.

The operation unit 530 includes, for example, various buttons provided in the digital camera 1 and a touch panel provided in the display unit 520, as well as a transmission unit for detecting information of operation performed through the various buttons or the touch panel and transmitting the information to the storage unit 40 and information processing unit 20, and transmits information of user operation to the storage unit 40 and information processing unit 20.

The digital camera 1 uses the above configuration to take an LFI, generate a reconstructed image RI from the LFI, and output the reconstructed image RI, as illustrated in FIG. 3B.

Next, a configuration of the image reconstruction device 30 will be described with reference to FIGS. 4A and 4B.

The image reconstruction device 30 is composed of an information processing unit 31, a main storage unit 32, an external storage unit 33, an input/output unit 36, and an internal bus 37, as illustrated in FIG. 4A.

The information processing unit 31 is composed of a central processing unit (CPU) and a random access memory (RAM) to be used as an internal cache, and uses portions other than the information processing unit 31 of the image reconstruction device 30 to perform processing that will be described later.

The main storage unit 32 has the same physical configuration as that of the main storage unit in the storage unit 40. The external storage unit 33 has the same physical configuration as that of the external storage unit in the storage unit 40, and stores a program 38. The input/output unit 36 has the same physical configuration as that of the I/O unit 510. The internal bus 37 connects the information processing unit 31, main storage unit 32, external storage unit 33 and input/output unit 36 to one another.

The information processing unit 31, main storage unit 32, external storage unit 33, input/output unit 36 and internal bus 37 may be functional blocks that are realized by an internal circuit of the information processing unit 20, storage unit 40 and interface unit 50 in the digital camera 1.

The image reconstruction device 30 copies the program 38 and data stored in the external storage unit 33 to the main storage unit 32. Then, the information processing unit 31 uses the main storage unit 32 to run the program 38, thereby performing processing of reconstructing an image that will be described later.

The image reconstruction device 30 uses the above physical configuration to function as an LFI acquisition unit 300, a photography setting acquisition unit 310, an information processing unit 320, a storage unit 330 and an output unit 340, as illustrated in FIG. 4B. The information processing unit 320 includes a mask acquisition unit 3210, a prototype definition unit 3220, a reconstructed pixel selecting unit 3230, a corresponding pixel extracting unit 3240 and a pixel value calculation unit 3250. The storage unit 330 includes a mask storage unit 3310, a reconstruction setting storage unit 3320 and a reconstructed image storage unit 3330.

The LFI acquisition unit 300 receives an LFI from the image processing unit 210, and transmits the LFI to the mask acquisition unit 3210 in the information processing unit 320.

The photography setting acquisition unit 310 receives photography setting information from the image processing unit 210, and transmits the photography setting information to the mask acquisition unit 3210.

The information processing unit 320 uses information acquired from the LFI acquisition unit 300 and photography setting acquisition unit 310 and information stored in the storage unit 330 to generate a reconstructed image from the LFI. The information processing unit 320 outputs the generated reconstructed image to the output unit 340 via the reconstructed image storage unit 3330.

The mask storage unit 3310 in the storage unit 330 stores a mask and a parameter-mask correspondence table that will be described later. The reconstruction setting storage unit 3320 stores reconstruction setting that includes a virtual distance al from the main lens of an object to appear in a reconstructed image. The reconstructed image storage unit 3330 stores a pixel value of each pixel composing a reconstructed image that is calculated by the information processing unit 320, and transmits a generated reconstructed image to the output unit 340.

The output unit 340 outputs the transmitted reconstructed image to outside (the image storage unit 420).

When the mask acquisition unit 3210 in the information processing unit 320 acquires an LFI from the LFI acquisition unit 300 and photography setting information from the photography setting acquisition unit 310, the mask acquisition unit 3210 acquires a mask corresponding to the photography setting information from masks stored in the mask storage unit 3310.

This mask (region information) defines pixels composing the LFI in such a way that a region included in a sub-image (a sub-image region) and a region not included in a sub-image (a region other than a sub-image region) are differentiated.

A mask (region information) that is stored in the mask storage unit 3310 and acquired by the mask acquisition unit 3210 will be described.

Figure 5A:
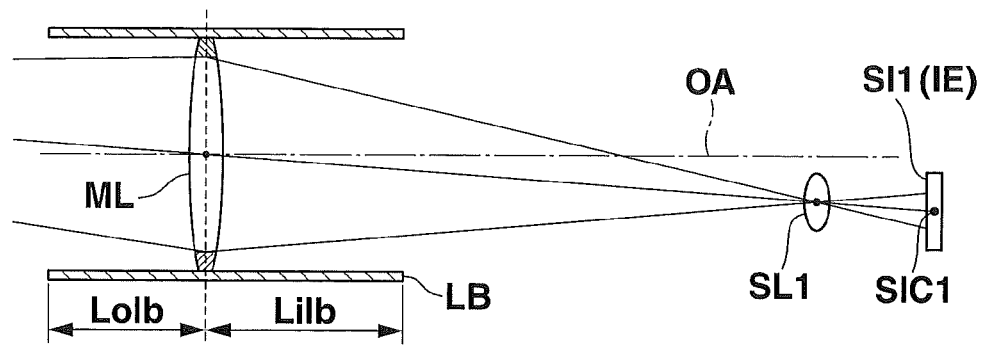
FIG. 5A is a diagram illustrating an example of the optical system of the digital camera according to the first embodiment.
Figure 5B:
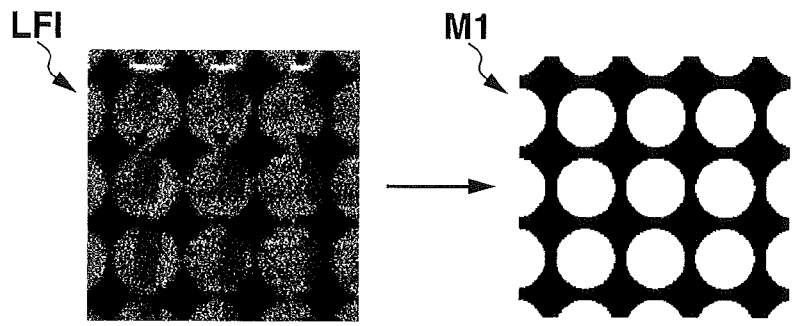
FIG. 5B is a diagram illustrating an example of an optical image taken by the optical system illustrated in FIG. 5A and a mask.
Figure 5C:
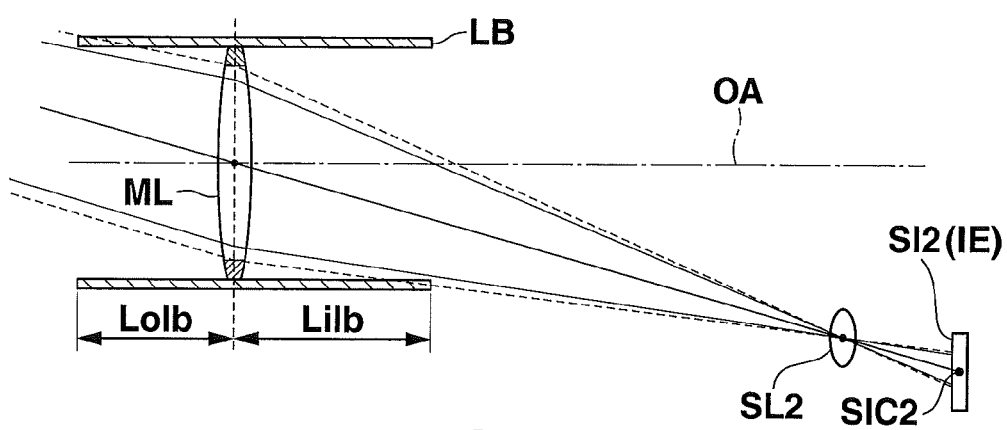
FIG. 5C is a diagram illustrating an example of an optical system of the digital camera according to the first embodiment.

The main lens ML is accommodated in the lens barrel LB (FIGS. 5A and 5C). Light that passes through the main lens ML and a sub-lens (SL1) projects an object image (a sub-image) onto the imaging area IE. A sub-image includes information of light rays from a predetermined angle with a chief ray being a center, the chief ray passing through a straight line connecting an optical center of the main lens ML and an optical center of the sub-lens SL1. An intersection point of a chief ray that passes through a sub-lens and the imaging area IE is the center of the sub-image (sub-image center SIC) corresponding to the sub-lens SL1 (SIC1 in FIG. 5A, SIC in FIG. 5C).

Light passing through the corresponding sub-lens (SL1, SL2) projects an image whose center is a sub-image center (SIC1, SIC) onto the imaging area IE. This image is approximately circular close to the optical axis OA of the main lens ML if the sub-lens is circular. The image corresponds to the sub-image, and whose outer edge contains much noise since the outer edge is affected by a portion outside the effective diameter ED of the main lens and a physical structure of the camera such as the lens barrel LB. Further, the outer edge is substantially affected by aberration of the micro-lens. Therefore, the outer edge has a small S/N ratio, which causes noise in generating a reconstructed image.

An S/N ratio of a pixel on the imaging area IE varies depending on photography setting (such as an imaging parameter and a physical structure of the camera) even if other conditions are the same. Therefore, reconstruction processing requires processing to estimate an S/N ratio of each pixel on the basis of photography setting to determine whether the S/N ratio is within an allowable range. However, if such processing is performed for each pixel in reconstructing an image, a calculation amount is huge.

In the present embodiment, a region where pixels of an LFI (LFI pixels) have an S/N ratio within an allowable range is called a sub-image region; and pixels within a sub-image region are called sub-pixels. In the present embodiment, an image within a sub-image region is called a sub-image; and a region beyond an allowable range is called a region other than a sub-image region, and pixels within the region other than a sub-image region are called non-sub-pixels. In the present embodiment, masks, each defining a sub-image region and a region other than a sub-image region, are stored corresponding to a variable parameter (a variable setting of photography setting) that can be expected in design. In reconstructing an image, a mask corresponding to a current photography setting is selected and used from the masks, thereby reducing a calculation amount. Hereinafter, a group of sub-pixels corresponding to a sub-lens will be called a sub-image of the sub-lens.

The lens barrel LB blocks incident light, but a light ray that passes through a sub-lens (such as SL1) close to the optical axis OA is not affected by the lens barrel LB so much (FIG. 5A). Therefore, in a portion close to the optical axis OA of an LFI (a portion close to the center of an LFI), a shape of the sub-image SI1 is nearly circular (left in FIG. 5B). Therefore, a sub-image defined by a mask is also nearly circular in this portion (right in FIG. 5B). In right in FIG. 5B, sub-pixels are represented by white color and non-sub-pixels are represented by black color. The same will apply hereinafter.

Figure 5D:
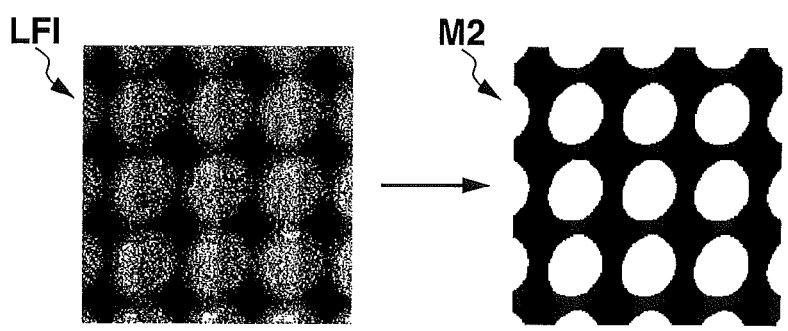
FIG. 5D is a diagram illustrating an example of an optical image taken by the optical system illustrated in FIG. 5C and a mask.

Meanwhile, a light ray that passes through a sub-lens (such as SL2) that is far from to the optical axis OA is substantially affected by the lens barrel LB, especially in a peripheral portion, and therefore the sub-image is distorted (left in FIG. 5D). As illustrated in FIG. 5C, a portion on SI2 far from the optical axis OA is mainly affected by a portion outside the lens barrel LB (outer lens barrel) whereas a portion on SI2 close to the optical axis OA is mainly affected by inside the lens barrel LB (inner lens barrel).

Therefore, a sub-image defined by a mask is also distorted due to effects of an inner lens barrel length (Lilb) and an outer lens barrel length (Lolb) in these portions (right in FIG. 5D).

Figure 6A:
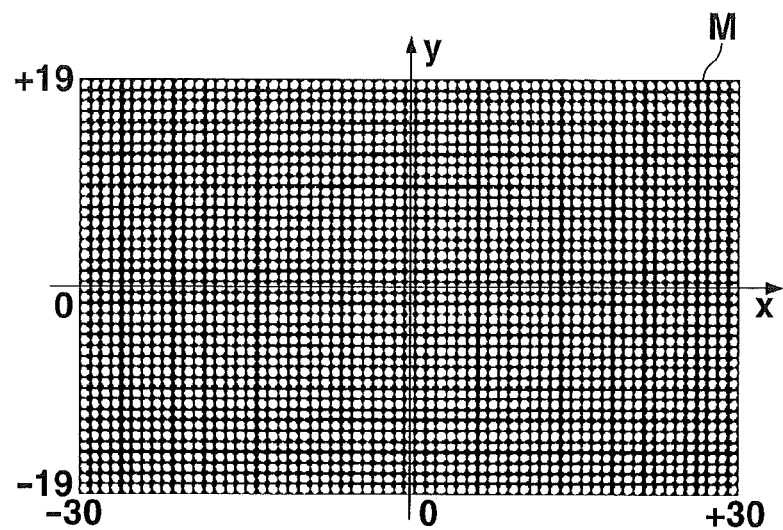
FIG. 6A is an overall view for explaining a mask according to the first embodiment.

A specific shape of a mask M acquired by the mask acquisition unit 3210 will be described with reference to FIGS. 6A, 6B and 6C. A mask M has the number of windows (each corresponding to a sub-image region) corresponding to the number of the sub-images. The center of the mask M corresponds to the optical axis OA (the center of LFI); and an axis of abscissas and an axis of ordinate are defined as x and y respectively with the center of the LFI being the origin (FIG. 6A). In this example, the mask has 61 (−30 to +30) windows in the x-axis direction and 39 (−19 to +19) windows in the y-axis direction. Hereinafter, a window in the x-th position horizontally and the y-th position vertically will be represented by W (x, y), and a sub-image corresponding to W (x, y) will be represented by SI (x, y).

Figure 6B:
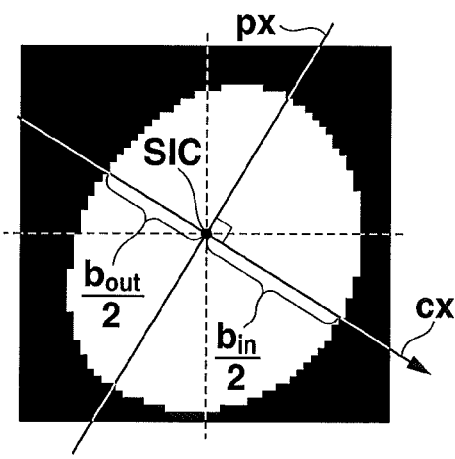
FIG. 6B is an enlarged view for explaining the mask according to the first embodiment.
Figure 6C:
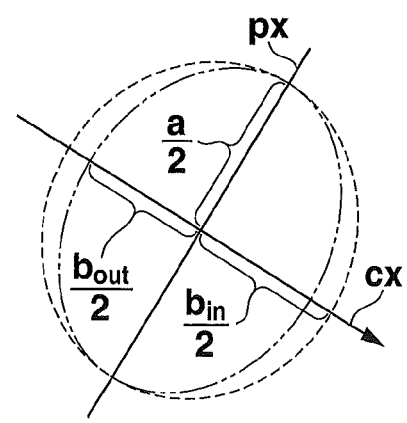
FIG. 6C is a shape of the enlarged view of FIG. 6B.

As a window corresponding to one sub-image, an upper left window (W (−29, +18)) in FIG. 6A is illustrated in FIG. 6B. The center of the window (corresponding to the center of a sub-image SI (−29, +18)) is indicated by SIC; a straight line passing through SIC and the center of the LFI is indicated by cx; and a straight line that passes through SIC and is perpendicular to cx is indicated by px. The arrow of cx indicates a direction of the center of the LFI.

In an example in FIG. 6B, W (−29, +18) is a distorted circle whose outer side is narrower than whose inner side toward the center of the LFI. This shape, as illustrated in FIG. 6C, inside px can be approximated by an ellipse whose major axis is a and whose minor axis is $b_{in}$ (dotted line) and outside px can be approximated by an ellipse whose major axis is a and whose minor axis is $b_{out}$ (dashed-two dotted line).

A shape of each window of a mask and a position of the center of a sub-image are defined by the following parameters. A specific method to generate a mask will be described later.

(1) Main lens setting (a largest diameter LD, an effective diameter ED, an inner lens barrel length Lilb and an outer lens barrel length Lolb of the main lens)

(2) A positional relationship of the main lens, a micro-lens and an imaging element (the imaging area IE) (a distance c1 between the main lens and a micro-lens, a distance c2 between a micro-lens and the imaging area IE)

(3) A distance between each micro-lens and the optical axis OA, a size and shape of each micro-lens The mask storage unit 3310 stores a mask generated so as to adapt to fixed parameters in setting of the above parameters. With respect to parameters that can vary for each photography instance, the mask storage unit 3310 stores masks, each adapting to a parameter in a range that can be expected in setting. To each mask is assigned an identifier that is an index (#1 to #M). The mask storage unit 3310 further stores a parameter-mask correspondence table (FIG. 7) to which an identifier of each mask and a range of each variable parameter corresponding to the mask are registered in association with each other.

An example of a parameter-mask correspondence table is illustrated in FIG. 7. This parameter-mask correspondence table is an example of a parameter-mask correspondence table where variable parameters to be considered are an aperture value and a zoom value (corresponding to a position of the main lens). Here, an aperture value corresponds to an effective diameter ED of the main lens in one-to-one relation. If a position of the main lens is decided according to a zoom value, an inner lens barrel length, an outer lens barrel length and a focal length $f_{ML}$ are uniquely decided where exchange of the main lens is not taken into consideration as in the present embodiment. In this example, zoom can be set to N stages (for example, 25 stages) in digital, and an aperture can be set from one (minimum aperture) to 100 (maximum aperture). The parameter-mask correspondence table defines one mask corresponding to a value that can be taken by these variable parameters. In the example in FIG. 7, if a zoom value indicated by photography setting is 2 and an aperture value is 18, the mask acquisition unit 3210 acquires #m+2 as a mask corresponding thereto.

The mask acquisition unit 3210 acquires a mask that matches a current photography setting information defined by the parameter-mask correspondence table, and then transmits the acquired mask and an LFI while the acquired mask overlapping the LFI to the prototype definition unit 3220.

The prototype definition unit 3220 disposes a prototype (a model) of a reconstructed image on a plane (a reconstruction plane) at a distance a1 from the main lens ML on the basis of reconstruction setting stored in the reconstruction setting storage unit 3320. Here, a prototype is an image whose pixel values are all zero (or unset). The defined prototype is transmitted to the reconstructed pixel selecting unit 3230.

The reconstructed pixel selecting unit 3230 decides one of pixels of a reconstructed image (reconstructed pixels) defined by the prototype definition unit 3220 to be a pixel of interest, and then transmits information of the pixel of interest to the corresponding pixel extracting unit 3240.

The corresponding pixel extracting unit 3240 tracks a light ray from the pixel of interest selected by the reconstructed pixel selecting unit 3230 to extract pixels on the LFI which light from the pixel of interest reaches (corresponding pixel candidates) for each of the sub-lenses. The corresponding pixel extracting unit 3240 extracts, of the corresponding pixel candidates, a pixel existing inside a window corresponding to the sub-lens (a region inside the sub-lens) as a pixel corresponding to the pixel of interest (corresponding pixel). Meanwhile, of the corresponding pixel candidates, a pixel existing outside a window corresponding to the sub-lens (a region outside the sub-lens) is excluded from pixels to be subjected to pixel value calculation processing, which will be described later.

In the present embodiment, for the photography setting and the reconstruction setting expected, it is adjusted so that a corresponding pixel of a pixel of interest is one for each sub-lens.

The corresponding pixel extracting unit 3240 transmits information of the extracted corresponding pixel to the pixel value calculation unit 3250.

The pixel value calculation unit 3250 calculates a pixel value of the pixel of interest on the basis of a pixel value of the corresponding pixel. Details of this processing will be described later.

The pixel value calculation unit 3250 stores the calculated pixel value of the pixel of interest in the reconstructed image storage unit 3330. The pixel value calculation unit 3250 sequentially sets a pixel to be a pixel of interest for all pixels included in the reconstructed image from the reconstructed pixel selecting unit 3230, decides a pixel value for the pixel, and calculates reconstructed pixels.

Figure 8:
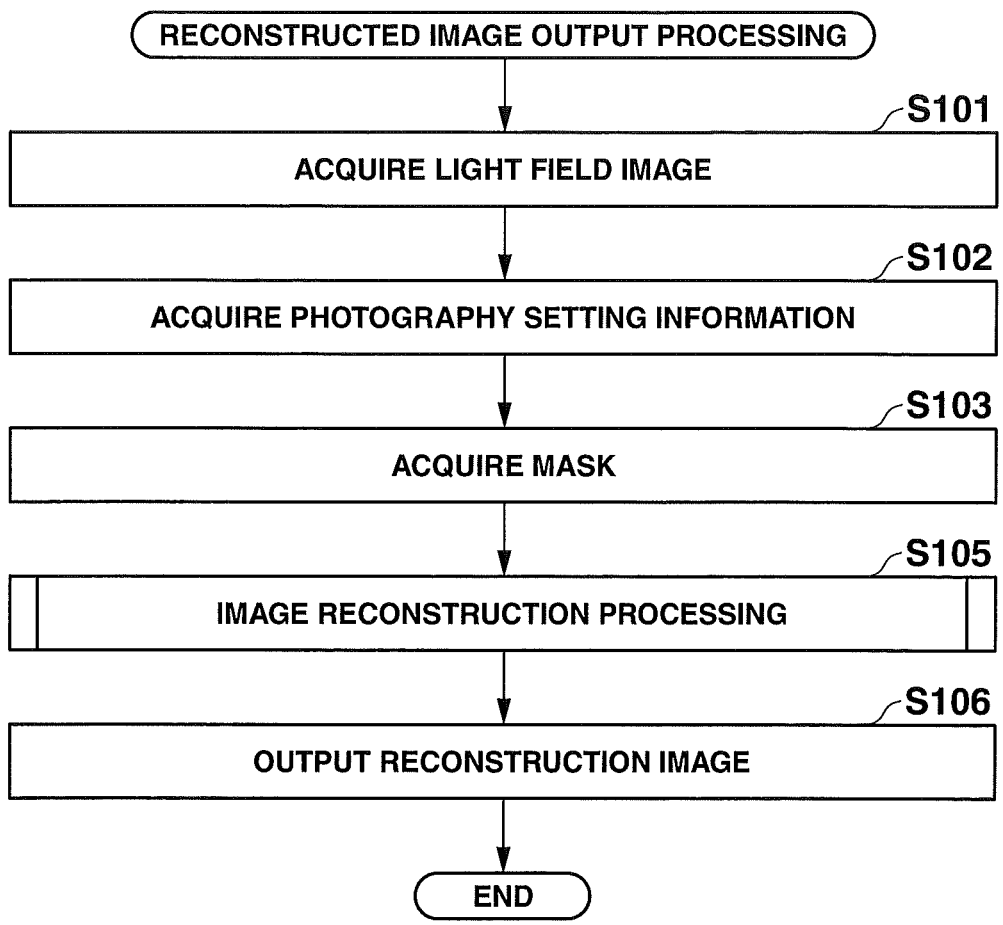
FIG. 8 is a flow chart illustrating a flow of reconstructed image output processing according to the first embodiment.
Figure 9:
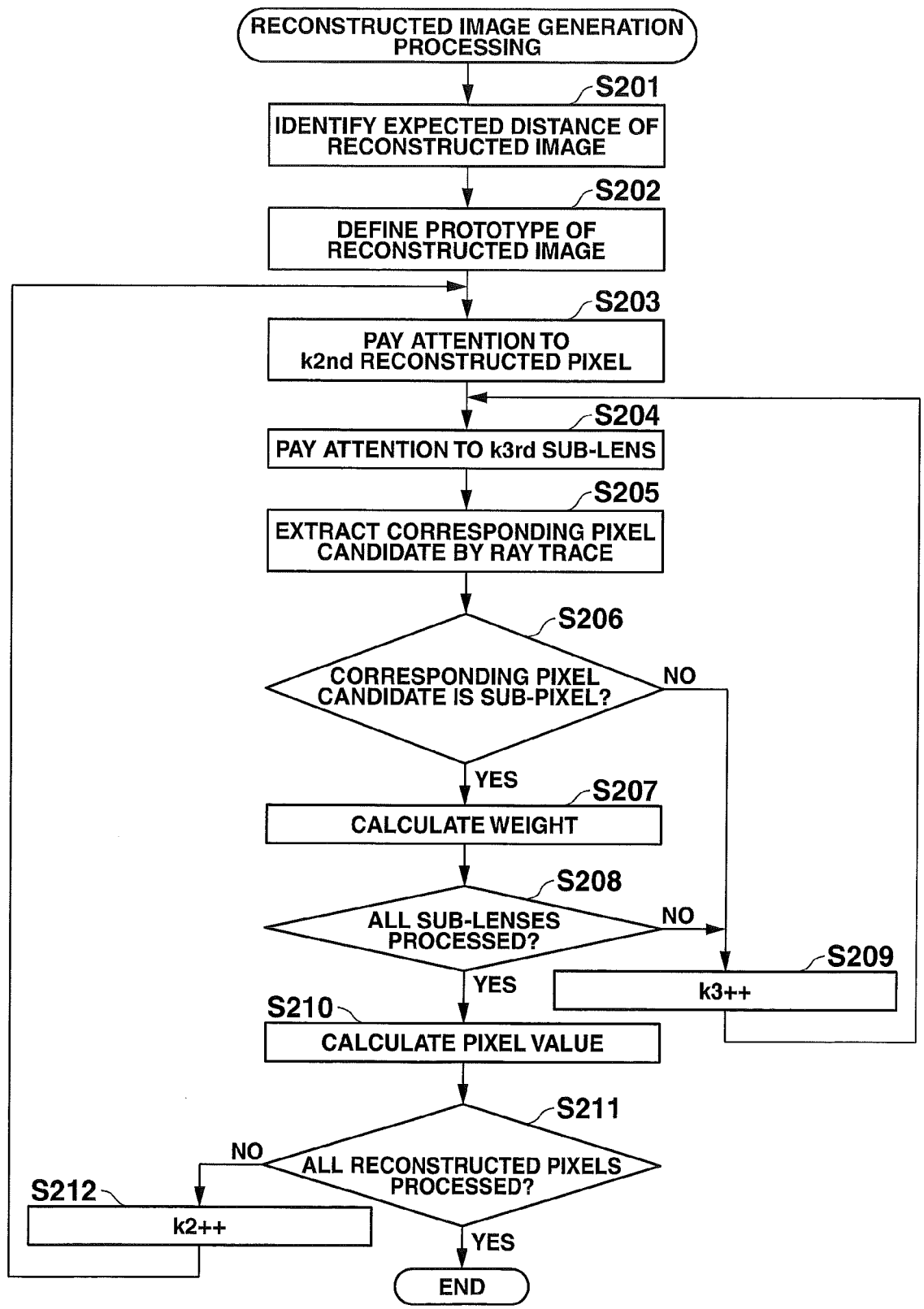
FIG. 9 is a flow chart illustrating a flow of reconstructed image generation processing according to the first embodiment.
Figure 10:
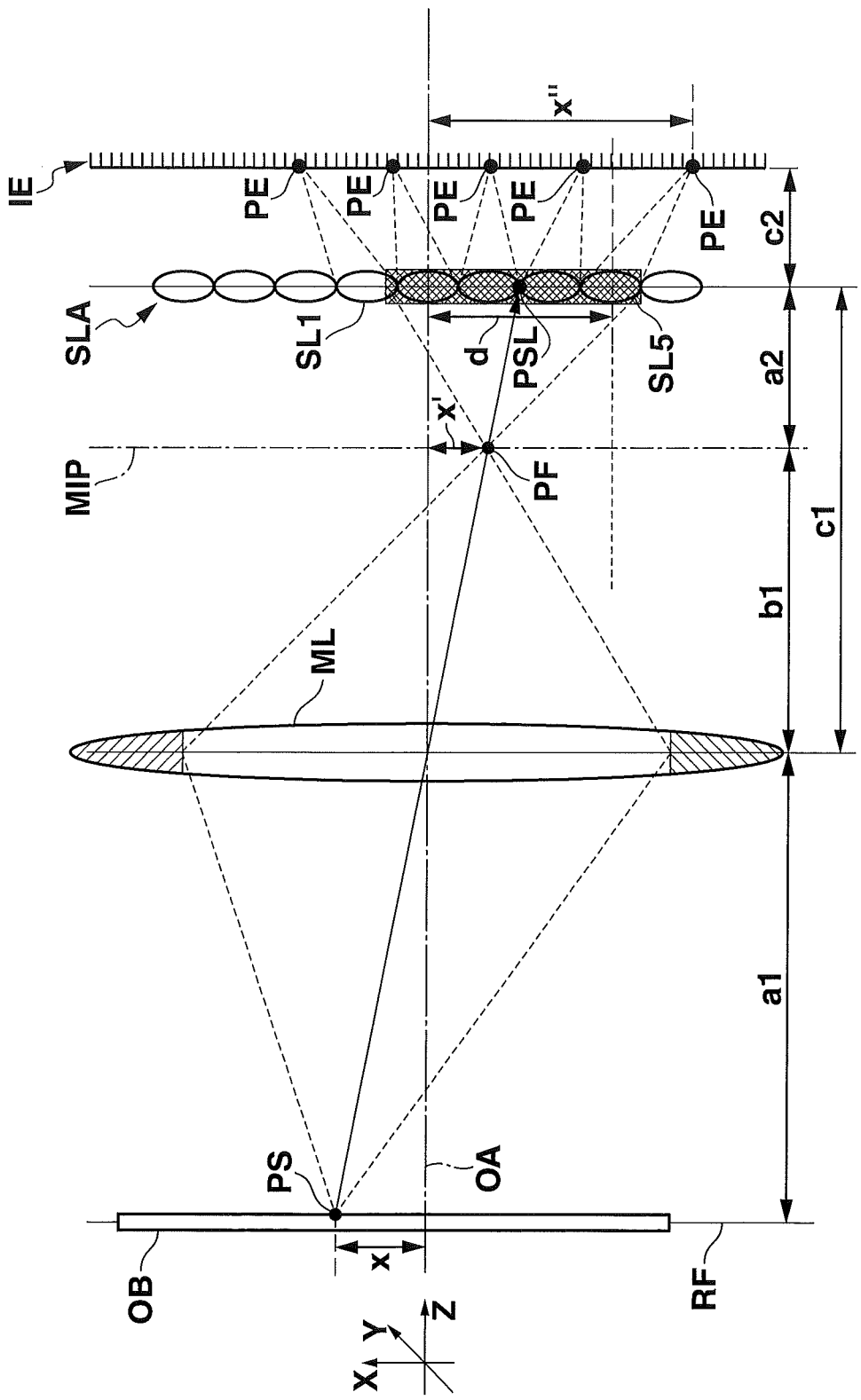
FIG. 10 is a diagram for explaining ray trace processing according to the first embodiment.

Here, process to generate a reconstructed image from an LFI and output the reconstructed image (reconstructed image output processing) that is performed by the image reconstruction device 30 will be described with reference to FIGS. 8 to 10.

When a user uses the digital camera 1 to take an LFI, the image processing unit 210 generates the LFI and transmits the LFI with photography setting information to the image reconstruction device 30. Then, the image reconstruction device 30 starts reconstructed image output processing illustrated in FIG. 8.

In reconstructed image output processing, the LFI acquisition unit 300 first acquires an LFI (Step S101).

Then, the photography setting acquisition unit 310 acquires photography setting information (Step S102).

Next, the mask acquisition unit 3210 acquires a mask that matches photography setting information decided in a parameter-mask correspondence table (Step S103). Specifically, the mask acquisition unit 3210 refers to the parameter-mask correspondence table, and acquires an index of a mask in such a way that a parameter that changes at every photographing and is to be taken into consideration in acquiring a mask (here, an aperture value and a zoom value) of photography setting information is an argument. Then, the mask acquisition unit 3210 acquires a mask that matches the acquired index from masks stored in the mask storage unit 3310. After that, by having the mask overlap the LFI, the LFI is divided into a sub-image region and a region other than a sub-image region.

Then, the information processing unit 320 uses the acquired mask to perform processing for generating a reconstructed image (reconstructed image generation processing) (Step S105).

Reconstructed image generation processing performed at Step S105 will be described with reference to FIGS. 9 and 10.

First, the reconstructed pixel selecting unit 3230 identifies a distance between the main lens and a reconstruction plane RF that is specified by reconstruction setting (Step S201) and places a model (prototype) of a reconstructed image on the reconstruction plane RF (Step S202).

Then, the reconstructed pixel selecting unit 3230 sets k2 to be a counter variable, and sets one of reconstructed pixels to be a pixel of interest (Step S203). At this time, the pixel of interest corresponds to a position of interest PS on the reconstruction plane RF in FIG. 10.

Next, the corresponding pixel extracting unit 3240 identifies a position (an arrival position PSL on a sub-lens) where a light ray from the position of interest PS uses photography setting information to pass through the principal point of the main lens to reach the micro-lens array. The corresponding pixel extracting unit 3240 uses a lens property to find a range (main lens blur, a shaded region in FIG. 10) where light from the position of interest reaches around the arrival position PSL. A diameter of a main lens blur is calculated from a distance a1 between the main lens ML and the reconstruction plane RF, a distance b1 between the main lens and the imaging plane MIP (that is calculated from a1 and a focal length $f_{ML}$ of the main lens), a distance a2 between the imaging plane MIP and the sub-lens array SLA and an effective diameter ED of the main lens, with the use of similarity of triangles.

The corresponding pixel extracting unit 3240 identifies a sub-lens SL part or all of which is included in the main lens blur from the sub-lenses SL included in the sub-lens array SLA. In an example in FIG. 10, SL1 to SL5 are included in the main lens blur. Then, the corresponding pixel extracting unit 3240 sets k3 to be a counter variable and selects the Kurd sub-lens as a lens of interest from the identified sub-lenses (Step S204).

The corresponding pixel extracting unit 3240 performs ray trace to extract a pixel (a corresponding pixel candidate) at a position on the sub-image where a light ray from a pixel of interest is imaged by the selected sub-lens (Step S205).

Specifically, a corresponding pixel candidate (corresponding to an arrival position PE) is calculated by the following procedures.

First, a distance b1 to a focal point of the main lens that corresponds to the reconstruction plane RF is calculated from known values a1 and $f_{ML}$ by the following expression (1).

$$b1 = \frac{a1 \times f_{ML}}{a1 - f_{ML}} \quad (1)$$

A distance a2 can be found by subtracting b1 calculated with the use of expression (1) from a known value c1.

Further, an object distance a1, a distance b1, and a known value x (a distance between PS and the optical axis OA) are substituted into the following expression (2) to calculate a distance x' between the optical axis OA and a point (an imaging point PF) where a position of interest PS is imaged through the main lens ML.

$$x' = x \cdot b1/a1 \quad (2)$$

Further, a distance d between the optical axis OA and a principal point of the Kurd sub-lens SL (SL5 in an example of FIG. 10), a distance x' calculated by the above expression (2), a distance c2 between the micro-lens array LA and the imaging area IE, and a distance a2 are substituted into the following expression (3) to calculate a distance x'' between an arrival point PE and the optical axis OA.

$$x'' = (d - x') \times \frac{c2}{a2} + d \quad (3)$$

The same calculation is performed regarding the Y-axis direction to identify a position of the arrival point PE.

Then, the corresponding pixel extracting unit 3240 determines whether a corresponding pixel candidate is a pixel within a region of a sub-image corresponding to the sub-lens of interest defined by the mask (a sub-pixel) (Step S206).

At Step S206, if it is determined that the corresponding pixel candidate is not within the region of a sub-image (Step S206; No), it can be determined that the pixel does not contain effective information of the pixel of interest. Accordingly, Step S207 is skipped, and the pixel will not be subjected to calculation to find a pixel value of a pixel of interest.

Then, the corresponding pixel extracting unit 3240 increments k3 (Step S209), and repeats processing from Step S204 for a subsequent sub-lens as a sub-lens of interest.

If it is determined that the corresponding pixel candidate is a sub-pixel that is within a sub-image region (Step S206; YES), the corresponding pixel extracting unit 3240 determines that the pixel is a corresponding pixel. Then, the pixel value calculation unit 3250 calculates an area of overlapping the sub-lens of interest and the main lens blur and divides the calculated area by an area of the sub-lens to find a weight coefficient of the sub-lens (Step S207).

Then, the corresponding pixel extracting unit 3240 determines whether all sub-lenses that overlap the main lens blur have been subjected to the above processing (Step S208). If there is an unprocessed sub-lens (Step S208; NO), the corresponding pixel extracting unit 3240 increments k3 (Step S209), and repeats processing from Step S204 for a subsequent sub-lens as a sub-lens of interest.

If all sub-lens that overlap the main lens blur have been processed (Step S208; YES), the pixel value calculation unit 3250 extracts a pixel value of each corresponding pixel determined at Step S206, and uses a weight calculated at Step S207 to perform a weighted addition.

The pixel value calculation unit 3250 divides a value obtained by the weighted addition by a sum of overlapping areas to find a pixel value of a pixel of interest (Step S210).

After a pixel value of a pixel of interest is calculated at Step S210, the reconstructed pixel selecting unit 3230 determines whether all reconstructed pixels have been subjected to the above processing (Step S211).

If there is an unprocessed reconstructed pixel (Step S211; No), the reconstructed pixel selecting unit 3230 increments k2 (Step S212), and repeats processing from Step S203 for a subsequent reconstructed pixel as a pixel of interest.

Meanwhile, if all reconstructed pixels have been processed (Step S211; YES), reconstructed image generation processing is terminated.

Returning to FIG. 8, after a reconstructed image is generated at Step S105, the output unit 340 outputs the generated reconstructed image to outside (the image storage unit 420) (Step S106). Then, reconstructed image output processing is terminated.

After that, the reconstructed image is outputted to the display unit 520 and/or the I/O unit 510.

Next, an example of processing of generating a mask to be stored in the mask storage unit 3310 will be described with reference to FIG. 11.

An information processor (hereinafter referred to as a mask generation device) performs mask generation processing illustrated in FIG. 11 to generate a mask to be stored in the mask storage unit 3310 in the image reconstruction device 30 of the digital camera 1. The mask generation device is an information processor having a physical configuration as illustrated in FIG. 4A. The mask generation device may be an information processing unit of the digital camera 1 or a common computer.

Figure 11:
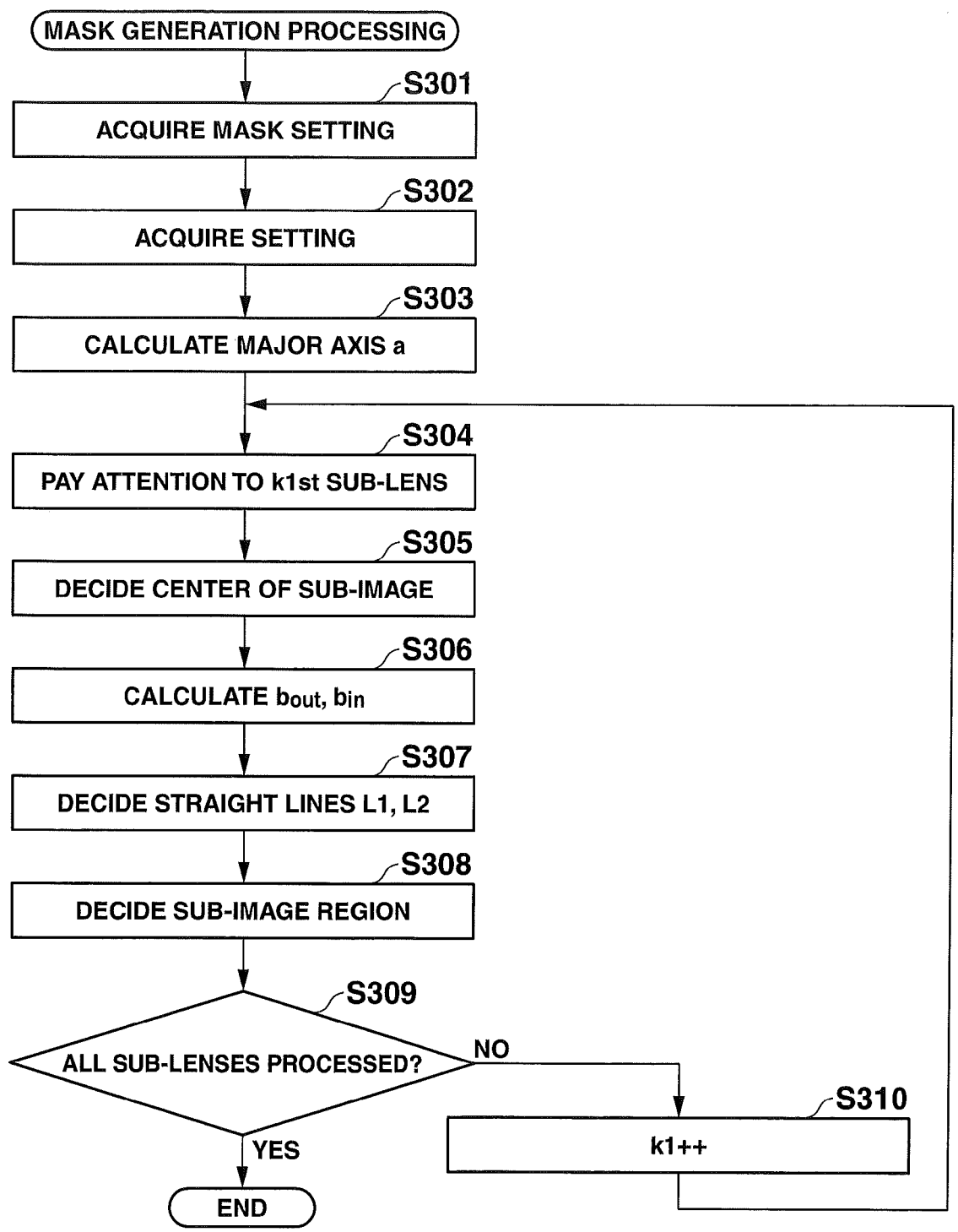
FIG. 11 is a flow chart illustrating a flow of mask generation processing according to the first embodiment.

When power is turned on and an operation of user to start processing to generate a mask is received, the mask generation device starts mask generation processing illustrated in FIG. 11.

In mask generation processing, the mask generation device acquires setting of a mask to be generated (a resolution of an LFI, the numbers of sub-images in vertical and horizontal directions, respectively) (Step S301). Here, the mask generation device generates a mask having windows for 39 sub-images in a vertical direction and 61 sub-images in a horizontal direction illustrated in FIG. 6A. The mask generation device also sets an entire region to a region other than a sub-image region as an initial setting.

Then, the mask generation device acquires setting for generating a mask (Step S302). Here, the mask generation device acquires the following values in the digital camera 1 as setting values.

(1) an aperture value (a representative value) and an effective diameter ED of the main lens corresponding to the aperture value; and a range of an aperture value to which a mask can be applied (2) a largest diameter LD of the main lens ML (3) a zoom value; and a focal length $f_{ML}$, an inner lens barrel length Lilb, an outer lens barrel length Lolb, a distance between the main lens ML and the sub-lens array SLA (c1) where the main lens is set with the zoom value (4) arrangement of each sub-lens (a position of the optical center of each sub-lens relative to the optical axis OA)

(5) a distance c2 between the imaging area IE and the sub-lens array SLA

Each parameter of these (1) to (5) may be a representative value and an applicable allowable range.

These setting values are set based on a physical configuration of the digital camera 1.

Then, the mask generation device calculates a major axis a (a length in a direction of an axis px in FIG. 6C) of each window W(−30, −19) to W(+30, +19) (Step S303). The longer an effective diameter ED of the main lens corresponding to an aperture value becomes (provided that other conditions are the same), the longer the major axis a becomes. The longer a distance c2 becomes (provided that other conditions are the same), the longer the major axis a becomes. Further, the shorter a distance c1 becomes (provided that other conditions are the same), the longer the major axis a becomes. An major axis a is calculated from an effective diameter ED, a distance c1 between the main lens ML and the sub-lens array SLA, and a distance c2 between the imaging area IE and the sub-lens array SLA using the following expression (4).

$$a = ED \times c2/c1 \quad (4)$$

Here, a major axis a is common for all windows.

A major axis a may be calculated by an arbitrary calculation method on condition that the longer an effective diameter ED of the main lens or a distance c2 becomes, or the shorter a distance c1 becomes, the longer the major axis a becomes. For example, the expression, $ED^2 \times c2^2/c1^2$ can be used instead of the above expression. Alternatively, the digital camera 1 may take a teacher image, compare a sub-image candidate on an obtained LFI with the teacher image, and average lengths in the axis px direction of regions where noise is less than or equal to a certain value to obtain an value, thereby setting the obtained value to be a major axis a of each sub-image.

Then, the mask generation device sets k1 to be a counter variable and selects the k1st sub-lens SL on the sub-lens array SLA as a sub-lens of interest (Step S304).

Next, the mask generation device finds, for a sub-lens of interest, a position of a sub-image center SIC (Step S305). The sub-image center SIC is a point where a straight line connecting the optical center of the main lens ML and the optical center of a sub-lens of interest intersects with the imaging area IE. Hereinafter, a distance between the optical center of a sub-lens of interest and the optical axis OA will be represented by x".

Further, the mask generation device calculates a length in the axis cx direction in the center direction of an LFI ($b_{in}$ and $b_{out}$ in FIG. 6C) of a window of a corresponding portion (Step S306).

In a sub-image SI corresponding to a sub-lens SL, a method to calculate $b_{in}$ and $b_{out}$ will be described with reference to FIG. 12. Light that reaches the sub-image SI is light rays within a predetermined range whose center is a straight line L passing through the optical center of the main lens ML and the optical center of the sub-lens SL.

Here, a line connecting the optical center of the sub-lens SL and an end of the inner lens barrel (an inner line Lin) is a line whose chief ray does not contact the lens barrel LB and that is closest to the lens barrel LB, of light rays that reach a region at the optical axis OA side of the sub-image.

Light that passes from a point outside the optical axis OA of the sub-image SI through the optical center of the sub-lens SL to reach the main lens ML is subjected to ray trace, thereby obtaining a line whose chief ray contacts the outer lens barrel and that is the closest to the lens barrel LB (an outer line Lout).

Figure 12:
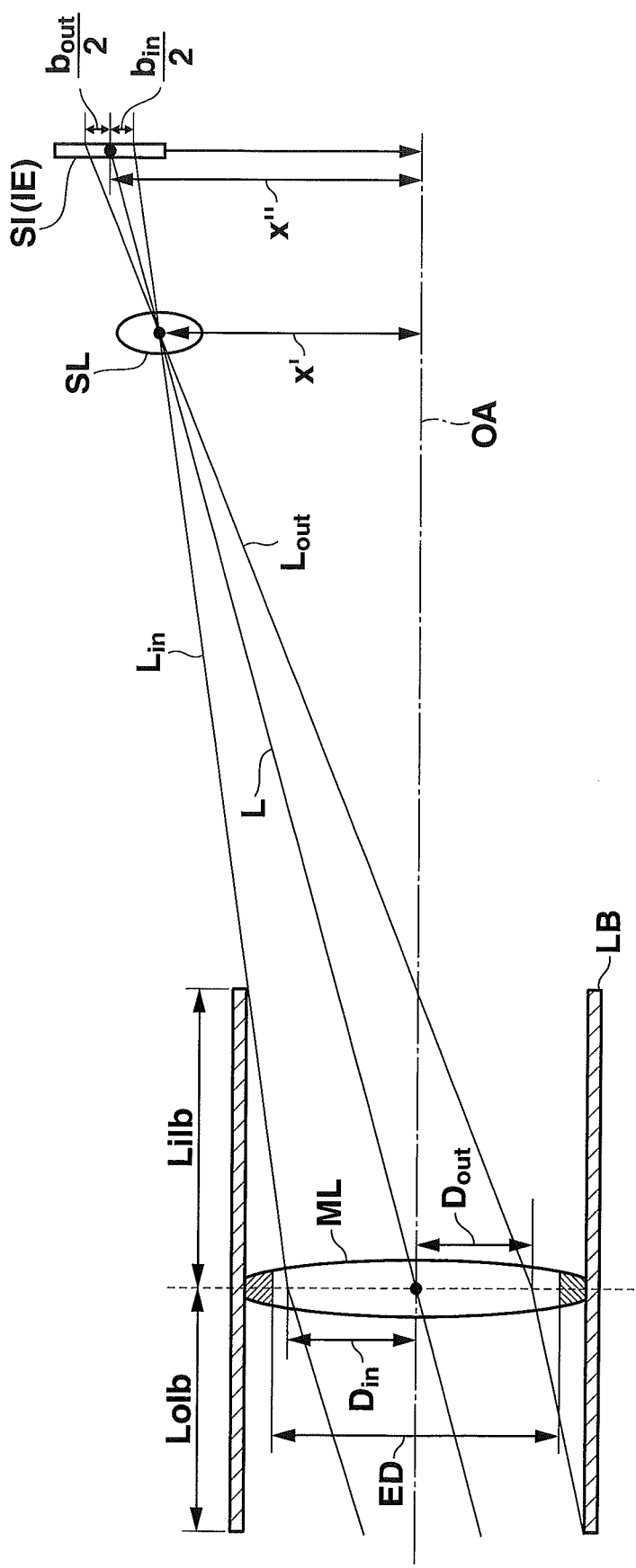
FIG. 12 is a diagram for explaining a relationship between a physical structure of an optical system and a shape of a sub-image according to the first embodiment.

As illustrated in FIG. 12, of light rays reaching the sub-image SI, light rays whose chief ray is not blocked by the lens barrel LB is light rays between the outer line Lout and the inner line Lin.

A distance between the optical axis OA of the main lens ML and an intersection point of Lout and the main lens ML is represented by $D_{out}$. A distance between the optical axis OA of the main lens ML and an intersection point of Lin and the main lens ML is represented by $D_{in}$. $D_{out}$ and $D_{in}$ can be found from a refractive index (corresponding to a zoom value one-to-one) of the main lens, c1, c2, Lolb, Lilb, and a position (x') of the sub-lens relative to the optical axis OA.

As illustrated in FIG. 12, the smaller a degree of blocking light that reaches the sub-image by the outer lens barrel becomes (the larger $D_{out}$ becomes), the larger $b_{out}$ becomes. The larger c2 becomes, the larger $b_{out}$ becomes. Meanwhile, the larger c1 becomes, the smaller $b_{out}$ becomes.

The smaller a degree of blocking light by the inner lens barrel becomes (the larger $D_{in}$ becomes), the larger $b_{in}$ becomes. The larger c2 becomes, the larger $b_{in}$ becomes. Meanwhile, the larger c1 becomes, the smaller $b_{in}$ becomes. The smaller a distance between an end of an effective diameter ED and the lens barrel LB becomes (the smaller a difference between a largest diameter LD and an effective diameter ED becomes), the greater a degree of blocking light by the lens barrel LB becomes. Therefore, where a largest diameter LD is the same, the smaller an effective diameter ED becomes, the greater a distortion of a shape of a sub-image SI (a difference between $b_{out}$ and $b_{in}$) becomes.

In the present embodiment, a region between the outer line Lout and the inner line Lin is an effective sub-image region, and uses the following expressions (5) and (6) that can be derived from FIG. 12 to calculate $b_{out}$ and $b_{in}$.

$$b_{in}=(D_{in} \times c2/c1) \times 2 \quad (5)$$

$$b_{out}=(D_{out} \times c2/c1) \times 2 \quad (6)$$

$b_{in}$ may be calculated using an arbitrary calculation method on condition that the smaller a degree of blocking light by the inner lens barrel becomes, the larger $b_{in}$ becomes (The larger c2 becomes, the larger $b_{in}$ becomes. The larger c1 becomes, the smaller $b_{in}$ becomes.). For example, expression (5) can be replaced by expression such as $D_{in}^2 \times c2^2/c1^2$. Alternatively, $b_{in}$ may be set in such a way that the digital camera 1 takes a teacher image, compares a sub-image candidate on an obtained LFI with the teacher image, obtains a length in the inside direction of the axis cx of a region where noise is less than or equal to a certain value, and sets the obtained value to be a length $b_{in}$ of each sub-image.

The same variation can be employed in finding $b_{out}$.

After $b_{out}$ and $b_{in}$ are found using expressions (5) and (6) at Step S306 as described above, the axis cx connecting the center of the sub-image obtained at Step S305 and the optical axis OA and an axis px that is perpendicular to the axis cx and passes through the center of the sub-image are decided on a mask (Step S307).

Further, based on a shape obtained in the above method, a window corresponding to a sub-lens of interest (a sub-image region) is defined on the mask (Step S308).

Here, a region that the optical axis OA side of the axis px from the center of the sub-image is an ellipse whose long axis is a and short axis is $b_{in}$ (an ellipse represented by a dotted line in FIG. 6C) and the other side of the axis px from the optical axis OA side is an ellipse whose long axis is a and short axis is $b_{out}$ (an ellipse represented by a dashed-two dotted line in FIG. 6C) is defined as a window corresponding to a sub-lens of interest (a sub-image region) on the mask. Where this mask is used, even if light reaches the found sub-image region as a matter of form, the sub-image region is dealt as a region other than a sub-image region if it is a result of trace of ray that passes through a sub-lens that is not a sub-lens of interest (a corresponding sub-lens).

Next, the mask generation device determines, for all of the sub-lenses, whether a corresponding sub-image region is defined (Step S309).

If there is an unprocessed sub-lens (Step S309; NO), the mask generation device increments a counter variable k1 (Step S310), and repeats processing from Step S304 for a subsequent sub-lens as a sub-lens of interest.

Meanwhile, if all sub-lenses have been subjected to the above processing (Step S309; YES), the mask generation device terminates mask generation processing for a current parameter.

A mask generated in this way is provided with an index of the mask, and is stored in the mask storage unit 3310. The provided index is registered in association with a corresponding dynamic parameter of a range to which this mask can be applied in a parameter-mask correspondence table.

Figure 13A:
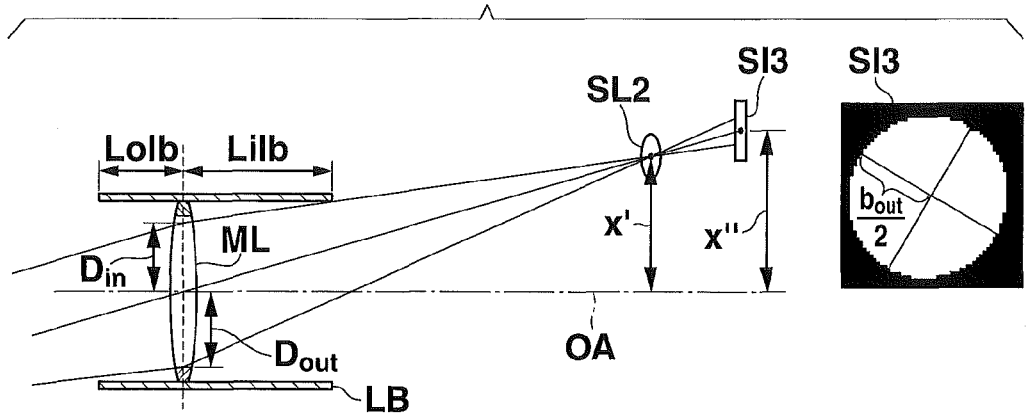
FIG. 13A is a diagram illustrating an example of a shape of a mask where a length of an outer lens barrel of an optical system is short according to the first embodiment.
Figure 13B:
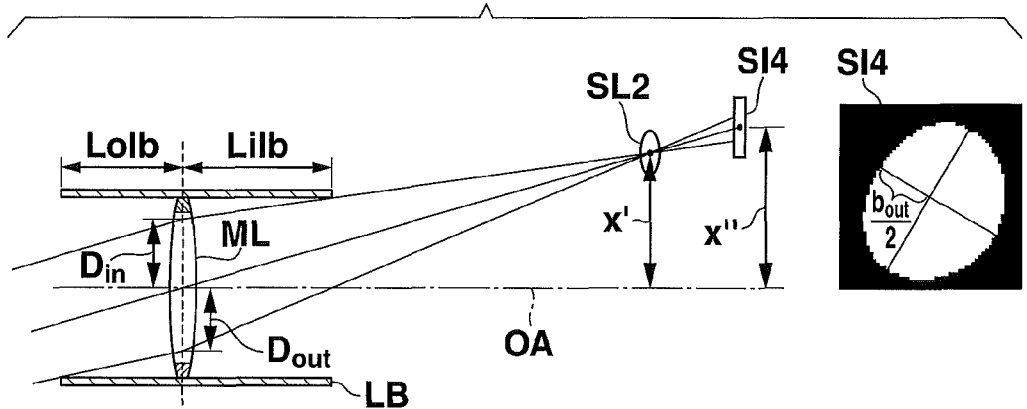
FIG. 13B is a diagram illustrating an example of a shape of a mask where a length of an outer lens barrel of an optical system is medium according to the first embodiment.
Figure 13C:
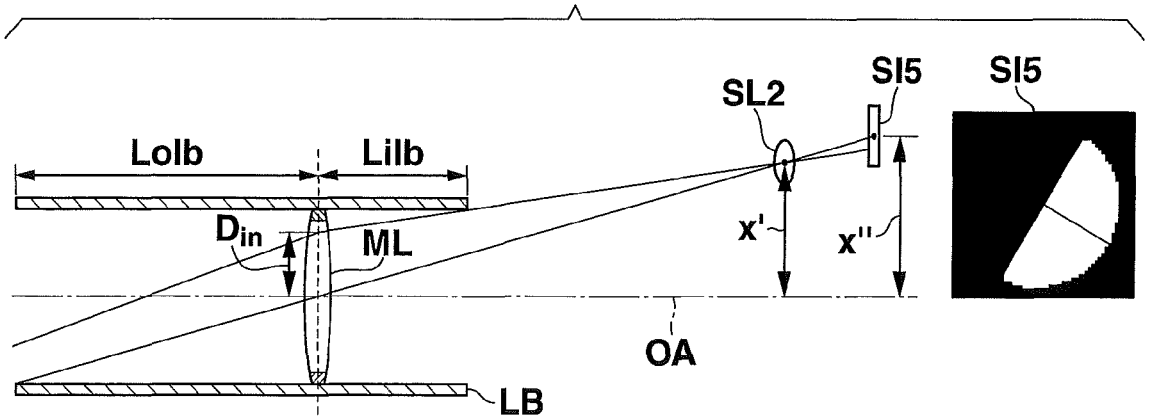
FIG. 13C is a diagram illustrating an example of a shape of a mask where a length of an outer lens barrel of an optical system is long according to the first embodiment.

In the present embodiment, an effect on a mask due to a change of an outer lens barrel length Lolb will be described with reference to FIGS. 13A, 13B and 13C. Where an outer lens barrel length Lolb is short (FIG. 13A), even if the sub-lens SL2 is apart from the optical axis OA by a slightly large distance x', $b_{out}$ of a corresponding sub-image (SI3) is not small, compared with a major axis a.

Where an outer lens barrel length Lolb is longer than that in FIG. 13A (FIG. 13B), if the sub-lens SL2 is apart from the optical axis OA by the same distance x', light that passes through the sub-lens to reach a region of a corresponding sub-image (SI4) on the opposite side of an axis px from the optical axis OA is blocked by the outer lens barrel.

As a result, $b_{out}$ of the corresponding sub-image (SI4) is smaller, compared with a major axis a.

Where the outer lens barrel length Lolb is further longer and the outer lens barrel contacts a straight line that connects the sub-lens SL2 and the main lens ML (FIG. 13C), most of light that should reach the region on the opposite side of the optical axis OA from an axis px is blocked.

As a result, $b_{out}$ becomes very short (SI5).

This change can be similar for a relationship between the inner lens barrel length Lilb and $b_{in}$.

The above processing is performed for a parameter necessary in setting and the result is stored in the mask storage unit 3310. By using this mask, processing to generate and display a reconstructed image can be performed with a small calculation amount.

As described above, the above embodiment does not require processing in which ray trace is performed for each sub-pixel and each sub-image, and an S/N ratio is estimated in view of a photographing parameter and a physical structure of an optical system used for photographing. In addition, weighting processing for each sub-pixel can be performed for only pixels in a sub-image region defined by a mask. Therefore, in the image reconstruction device 30 according to the present embodiment, a mask matching a parameter with which an LFI was acquired can be used to determine whether a region is a sub-image region or a region other than a sub-image region in high speed, reducing a calculation amount necessary for generating a reconstructed image. Since a pixel value is decided by using only pixels that are defined by a mask and whose S/N ratio is expected to be in an allowable range if an LFI is acquired in the photography setting, a reconstructed image with less noise can be generated.

The digital camera 1 according to the present embodiment enables one hardware to perform processing of acquiring an LFI and generating a reconstructed image in high speed. In addition, a smaller amount of processing of generating a reconstructed image can downsize the digital camera 1.

(Variation)

The present invention is not limited to the above embodiment, and various variations are possible.

For example, in the above example, a mask is generated by mask generation processing in FIG. 11. However, a method to generate a mask used in the present invention is not limited to this.

A mask in the present invention may be generated in any method to generate a mask having the following characteristics. As an example of another method to generate a mask corresponding to a photographing parameter, a method to use the digital camera 1 to photograph an object that becomes teacher data with the photographing parameter is possible. In such a method, a region whose S/N ratio is in a predetermined allowable range is found from pixels of an obtained LFI and the region is set to be a sub-image region.

In the above embodiment, a parameter-mask correspondence table in FIG. 7 is used to acquire a mask. However, an embodiment of the present invention is not limited to this, a parameter-mask correspondence table in which each of arbitrary parameters that need dynamic setting is associated with a mask can be employed. For example, where a main lens and/or a sub-lens of the digital camera 1 can be replaced, a parameter-mask correspondence table in which a lens barrel length and $f_{ML}$ are independent parameters to each other may be used to acquire an index of a mask.

A method to associate a parameter with a mask is not limited to a parameter-mask correspondence table, and any known corresponding method can be employed.

Such a configuration in which a method to associate a parameter with a mask is used to select a mask allows for a high-speed acquisition of a mask corresponding to a parameter in photographing.

In a mask according to the present invention, the larger a largest diameter (LD) of the main lens becomes and other setting is fixed, the smaller a difference in a mask shape between a peripheral portion and a central portion of an LFI becomes. That is, where a sub-image region is approximately a precise circle at and around a central portion of an LFI, if LD is large, a sub-image region is approximately a precise circle also at a peripheral portion of the LFI.

With such a characteristic, a mask reflects a largest diameter LD of the main lens, and therefore this mask allows for generation of a reconstructed image with a high accuracy, incorporating a size of the main lens.

In a mask according to the present invention, the larger an effective diameter ED of the main lens becomes and other setting is fixed, the larger a sub-image region becomes. With such a characteristic, a mask reflects an effective diameter of the main lens, and therefore this mask allows for generation of a reconstructed image with a high accuracy, incorporating an effective diameter of the main lens.

In a mask according to the present invention, the longer a lens barrel length of the main lens (inside and outside) becomes and other setting is fixed, the larger a difference in a shape of a sub-image region between at and around a central portion and at a peripheral portion of an LFI (a difference between $b_{in}$ and $b_{out}$ in the above example) becomes. With such a characteristic, a mask reflects a degree of blocking a light ray by a lens barrel, and therefore this mask allows for generation of a reconstructed image with a high accuracy, incorporating a degree of blocking a light ray by a lens barrel.

In a mask according to the present invention, the farther a sub-lens becomes from the optical axis OA, the larger distortion of a shape of a sub-image region corresponding to the sub-lens (a difference between $b_{in}$ and $b_{out}$ in the above example) becomes. With such a characteristic, a mask reflects a position of a sub-lens, and therefore this mask allows for generation of a reconstructed image with a high accuracy, incorporating a position of a sub-lens.

In a mask according to the present invention, the larger a distance between sub-lenses becomes and/or the larger a distance between a sub-lens and an imaging area becomes, the larger a distance between centers of sub-images becomes. Meanwhile, the larger a distance between the main lens and a sub-lens becomes, the smaller a distance between centers of sub-images becomes. With such a characteristic, a mask decides a position of the center of a sub-lens image, incorporating a position of a sub-lens and a position of an imaging area. Therefore, this mask allows for generation of a reconstructed image with a high accuracy.

In the above description, the mask storage unit 3310 stores masks, and a suitable mask is selected from the masks on the basis of a parameter. However, if a difference in shape between masks is small due to setting for taking an LFI and one mask can cover the entire setting, one mask may be stored.

In the above, a case where one pixel corresponds to one sub-lens is described, the present invention can be also applied to a case where pixels correspond to one sub-lens. In such a case, ray trace is used to extract pixel candidates corresponding to one sub-lens, and it is determined whether each of the pixel candidates is in a sub-image region to decide whether each of the pixel candidates is a corresponding pixel.

In the above description, a mask whose size is the same as that of an LFI is stored, but the present invention is not limited to this. A region whose shape can be equated with that of another region in a mask may be stored in a simplified form. For example, only an upper left region (¼ of the entire region) may be stored as data, and data obtained by reversing the upper left region in the horizontal or vertical direction may be arranged for a portion other than the upper left region. Such a configuration can save a storage area to store a mask.

Further, a method to use a mask to extract a corresponding pixel from corresponding pixel candidates according to the present invention can be applied to any method of generating a reconstructed image from an LFI.

In the above, an example where an image is a grayscale image has been described, but an image to be processed in the present invention is not limited to a grayscale image. For example, an image may be an RGB image in which three pixel values of R (red), G (green) and B (blue) are defined for each pixel. In this case, the pixel values are similarly processed as vector values of RGB. The values of R, G, B may be subjected to the above processing as independent grayscale images, respectively. In this configuration, a reconstructed image that is a color image can be generated from a light field image that is a color image.

Further, the above hardware configuration and flow charts are merely examples, and can be arbitrarily changed and modified.

A main section that includes the information processing unit 31, main storage unit 32 and external storage unit 33 and performs control processing to reconstruct an image does not require a dedicated system, but can be realized by a common computer system. For example, a computer program for performing the above operation may be stored and distributed in a computer-readable recording medium (a flexible disk, a CD-ROM, a DVD-ROM or the like), and the computer program may be installed in a computer to configure the computer program. Alternatively, the computer program may be stored in a storage device in a server device on a communication network such as the Internet and be downloaded by a common computer system, thereby configuring an image reconstruction device.

If an operating system (OS) and an application program share a function of an image reconstruction device or works together to realize a function of an image reconstruction device, only the application program may be stored in a recording medium or a storage device.

It is also possible that a computer program is superimposed on carrier waves and distributed via a communication network. Then, by activating the computer program and executing it as with other application programs under control of the OS, the above processing may be performed to configure the computer program.

Having described and illustrated the principles of this application by reference to an embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An image generation device which generates a reconstructed image from a light field image including sub-images taken from different viewpoints, the image generation device comprising:
   a parameter acquiring section which acquires a photographing parameter in taking the light field image;
   an information acquiring section which acquires region information that decides a region of the sub-images included in the light field image based on the photographing parameter;
   a defining section which defines correspondence between a reconstructed pixel composing the reconstructed image and a sub-pixel in the region of the sub-images that was decided by the region information; and
   a generating section which decides a pixel value of the reconstructed pixel based on a pixel value of the corresponding sub-pixel to generate the reconstructed image.

2. The image generation device according to claim 1, further comprising
   a storage which stores pieces of region information that are associated with a condition of a photographing parameter,
   wherein the information acquiring section acquires, from the pieces of region information stored in the storage, region information that matches a photographing parameter acquired by the parameter acquiring section.

3. The image generation device according to claim 1, wherein:
   the light field image is an image photographed using a main lens and micro-lenses; and
   the photographing parameter includes a parameter corresponding to at least one of an effective diameter of the main lens, a length at an object-to-be photographed side of a lens barrel that accommodates the main lens, and a length at a micro-lenses side of the lens barrel.

4. The image generation device according to claim 3, wherein:
   in the region information, the larger a largest diameter of the main lens becomes, the smaller a difference in shape of the sub-images between a central portion close to an optical axis of the main lens and a peripheral portion far from the optical axis of the main lens becomes provided that the photographing parameter and other physical configuration of an optical system are the same.

5. The image generation device according to claim 3, wherein:
   in the region information, the larger an effective diameter of the main lens becomes, the larger a region of the sub-images becomes provided that the photographing parameter and other physical configuration of an optical system are the same.

6. The image generation device according to claim 3, wherein:
   in the region information, the longer either a length at the micro-lenses side of the lens barrel or a length at the object-to-be photographed side of the lens barrel becomes, the larger a difference in shape of the sub-images between a central portion close to an optical axis of the main lens and a peripheral portion far from the optical axis of the main lens becomes provided that the photographing parameter and other physical configuration of an optical system are the same.

7. The image generation device according to claim 3, wherein:
   in the region information, a sub-image is defined, for each of the micro-lenses,
   in such way that the farther the micro-lens becomes from an optical axis of the main lens, the larger distortion of a shape of a sub-image corresponding to the micro-lens becomes.

8. The image generation device according to claim 3, wherein:
   in the region information, a sub-image is defined, for each of the micro-lenses,
   in such a way that the larger either a distance between the micro-lenses or a distance between the micro-lens and an imaging area becomes, the larger a distance between centers of corresponding sub-images becomes.

9. The image generation device according to claim 1, wherein:
   the region information defines, a region whose S/N ratio is in an allowable range in taking a light field image with the corresponding photographing parameter, as a region of the sub-images.

10. A digital camera comprising:
    a photographing section which uses a main lens and micro-lenses to take a light field image including sub-images taken from different viewpoints;
    a parameter acquiring section which acquires a photographing parameter in taking the light field image;
    an information acquiring section which acquires region information that decides a region of the sub-images included in the light field image based on the photographing parameter;
    a defining section which defines correspondence between a reconstructed pixel composing a reconstructed image generated from the light field image and a sub-pixel in the region of the sub-images that was decided by the region information; and a generating section which decides a pixel value of the reconstructed pixel based on a pixel value of the corresponding sub-pixel to generate the reconstructed image.

11. A method of generating a reconstructed image from a light field image including sub-images taken from different viewpoints, the method comprising steps of:

acquiring a photographing parameter in taking the light field image;

acquiring region information that decides a region of the sub-images included in the light field image based on the photographing parameter;

defining correspondence between a reconstructed pixel composing the reconstructed image and a sub-pixel in the region of the sub-images that was decided by the region information; and deciding a pixel value of the reconstructed pixel based on a pixel value of the corresponding sub-pixel to generate the reconstructed image.

12. A non-transitory computer readable recording medium having stored thereof a program executable by a computer that controls an image generation device to generate a reconstructed image from a light field image that includes sub-images taken from different viewpoints, the program causing the computer to realize functions of:

acquiring a photographing parameter in taking the light field image;

acquiring region information that decides a region of the sub-images included in the light field image based on the photographing parameter;

defining correspondence between a reconstructed pixel composing the reconstructed image and a sub-pixel in the region of the sub-images that was decided by the region information; and deciding a pixel value of the reconstructed pixel based on a pixel value of the corresponding sub-pixel to generate the reconstructed image.

\* \* \* \* \*